US011775677B2

(12) United States Patent
Shahin et al.

(10) Patent No.: US 11,775,677 B2
(45) Date of Patent: Oct. 3, 2023

(54) TOKENIZATION AND ENCRYPTION FOR SECURE DATA TRANSFER

(71) Applicant: Goldman Sachs & Co. LLC, New York, NY (US)

(72) Inventors: Shahin Mahmoud Shahin, Clifton, NJ (US); Justin Joseph Smith, Marietta, GA (US)

(73) Assignee: GOLDMAN SACHS & CO. LLC, New York, NY (US)

( * ) Notice: Subject to any disclaimer, the term of this patent is extended or adjusted under 35 U.S.C. 154(b) by 91 days.

(21) Appl. No.: 17/238,845

(22) Filed: Apr. 23, 2021

(65) Prior Publication Data

US 2022/0343015 A1 Oct. 27, 2022

(51) Int. Cl.
*G06F 21/62* (2013.01)
*H04L 9/06* (2006.01)
*G06F 16/245* (2019.01)
*G06F 9/451* (2018.01)
*H04L 9/40* (2022.01)

(52) U.S. Cl.
CPC .......... *G06F 21/6245* (2013.01); *G06F 9/451* (2018.02); *G06F 16/245* (2019.01); *G06F 21/6209* (2013.01); *H04L 9/0618* (2013.01); *H04L 9/0643* (2013.01); *H04L 63/0435* (2013.01); *H04L 2209/08* (2013.01)

(58) Field of Classification Search
CPC .. G06F 21/62; G06F 21/6209; G06F 21/6218; G06F 21/6245; G06F 9/451; G06F 16/245; H04L 9/0618; H04L 9/0643; H04L 63/0435; H04L 2209/08
See application file for complete search history.

(56) References Cited

U.S. PATENT DOCUMENTS

| | | | | |
|---|---|---|---|---|
| 10,878,126 B1* | 12/2020 | Koduru | ................. | G06F 16/211 |
| 11,270,311 B1* | 3/2022 | Jass | ........................ | G06Q 20/388 |
| 2013/0212666 A1* | 8/2013 | Mattsson | ............. | G06Q 20/385 726/9 |
| 2015/0112870 A1* | 4/2015 | Nagasundaram | .... | G06Q 20/385 705/67 |
| 2015/0319158 A1* | 11/2015 | Kumnick | ................ | H04L 67/02 726/9 |
| 2017/0300873 A1* | 10/2017 | Krishna | ................ | G06Q 20/223 |
| 2019/0244196 A1* | 8/2019 | John | ........................ | G06Q 20/36 |
| 2021/0067316 A1* | 3/2021 | Bellenger | ................. | H04L 9/06 |

* cited by examiner

*Primary Examiner* — D'Arcy Winston Straub

(74) *Attorney, Agent, or Firm* — Fenwick & West LLP

(57) ABSTRACT

A system and a method are disclosed for securing sensitive data for transaction requests using tokenization and encryption. A secure transfer system secures sensitive information of transaction requests. The secure transfer system may receive a transaction request file and generate a modified transaction request file by tokenizing values in the received file. For each transaction request in the file, the system may store a representation of the untokenized values in a datastore in conjunction with an identifier of the transaction request. This identifier may be generated from the tokenized values. The secure transfer system may use the identifier to query the datastore for the representation of the untokenized values. The system may decrypt encrypted values in the representation to generate a transaction request file of detokenized values, which may be provided to an automated clearing house to fulfill the transaction requests.

20 Claims, 11 Drawing Sheets

Data Transfer Log

| Client A | Client B | Client C | | |
|---|---|---|---|---|
| DFI Account No. | Amount | Individual ID No. | Individual Name | Trace Number |
| aN76vvWLPqakMB8sc | 500,578 | 9vbtyTV001bnfqZ | tUiNmmE29kLpdBqPMfZ27m | 272039 |
| OCS0mvAlddDSdL7Or | 059,243 | 4FgYzjcscENHEnK | 0m0kSOEyvnVT6f67pwcjos | 272040 |
| WwalledErtJ4jaS7g | 464,393 | j5re3manSTVnvKp | BDdznr1wDj79nw7ooyA2rf | 272041 |
| zD6RdOO5ht1ugJKFZ | 384,206 | JTClEZ8WX921uWm | Qsf0kqJJwRAXPnMJtgbuTV | 272042 |
| GOMMnMmJi0Cx2gfWa | 122,247 | Ohm7Fz5ZRlC4aal | rRg7CDhHFjtR77ciprnxYk | 272043 |
| c7B8G7l0UYFmAJ0Jx | 083,573 | zlmA9BArbkzHeVg | e1eh7pZpgFym3U6ciJhHus | 272044 |
| Pzbzarkcza1Dy0BP2 | 962,431 | UhwPKQXf5k0TJ7o | C2TJBwh9RPFyXzFSdQwbR2 | 272045 |

Export

FIG. 9

TOKENIZATION AND ENCRYPTION FOR SECURE DATA TRANSFER

TECHNICAL FIELD

The disclosure generally relates to securing data and in particular, securing sensitive data for transaction requests using tokenization and encryption.

BACKGROUND

Transaction requests contain sensitive information to fulfill the requests and are conventionally handled by systems that, while authorized to handle the information, may fail to secure the sensitive information to a greater extent than what is minimally required to process the requests. This can leave weaknesses for sensitive information to be compromised by users of these authorized systems. For example, a bank may facilitate the processing of payroll files between a client and an automated clearing house (ACH), where employees at the bank may be authorized to access and view sensitive payroll information (e.g., beneficiary names and the amount they are paid). An automated clearing house may require that the payroll files be unencrypted to fulfill the transaction requests in the payroll files. The bank may neglect to secure sensitive information in payroll files because the automated clearing house receiving the files to does not require the bank to secure the information. This leaves the sensitive information vulnerable while it is accessible to authorized employees of the bank that do not necessarily need to access the information.

SUMMARY

A secure transfer system secures sensitive information of transaction requests and stores tokenized versions of the information for access by users of the secure transfer system. Since tokenization randomizes the sensitive information, the secure transfer system enables a high level of security for the sensitive information that is accessible by the users who are unlikely to discern or reverse engineer the sensitive information from the tokenized values. The secure transfer system hashes or encrypts the sensitive information and stores the secured information within a datastore that may be subsequently retrieved using the tokenized information, which provides another layer of security for accessing the secured information. In one example, the secure transfer system detokenizes information to provide to an automated clearing house by using an identifier to lookup secured information within the datastore and performing decryption to obtain the untokenized values originally received (e.g., from a payroll file sent by a client device for fulfillment).

In one embodiment for securing data, the secure transfer system receives a transaction request file that includes transaction requests. Each transaction request may have a set of fields (e.g., a beneficiary name, the beneficiary's bank account number, etc.). A modified transaction request file may be generated by replacing, for each transaction request in the file, untokenized values of a subset of the fields with tokenized values. For each transaction request, a representation of the untokenized values may be stored in a datastore in conjunction with an identifier of the transaction request in the modified transaction request file. This identifier may be generated from the tokenized values. The modified transaction request file may be sent to a first destination (e.g., a risk engine). The secure transfer system may detokenize the modified transaction request for a second destination (e.g., an automated clearing house). For each transaction request, the modified transaction request file may be detokenized by regenerating the identifier from the tokenized values, querying the datastore using the regenerated identifier to retrieve the representation of the untokenized values, and replacing the tokenized values with the untokenized values using the representation of the untokenized values. The secure transfer system may then send the detokenized modified transaction request file to the automated clearing house.

In some embodiments, the identifier may be generated by combining two or more tokenized values (e.g., concatenating the values). The tokenized values may include an individual name, an individual identification number, and a depository financial institution (DFI) account number. The representation of the untokenized values may be generated by applying a hash algorithm to a first untokenized value (e.g., a DFI account number) and encrypting a second untokenized value (e.g., a DFI account number, an individual identification number, or an individual name). The second untokenized value may be encrypted using symmetric-key cryptographic block cipher encryption. In some embodiments, an initialization vector or additional authenticated data (AAD) may also be used in the encryption. A secret key used for the symmetric-key cryptographic block cipher encryption may be stored in a datastore that is separate from the datastore that the secured information is stored in, providing additional security. The secure transfer system may generate the initialization vector, which may include randomized values. The AAD may include a trace number, a DFI account number, a receiving DFI identification, a check digit, or combination thereof.

The tokenized values may be replaced with the untokenized values using the representation of the untokenized values by inputting the tokenized values and in some embodiments, the initialization vector or the AAD into the symmetric-key cryptographic block cipher for decryption. Destinations to which information of the transaction requests are sent by the secure transfer system may include a risk engine, fraud engine, anti-money laundering (AML) service, an automated clearing house, or combination thereof. The modified transaction request file may be generated by replacing untokenized values of a DFI account number, an individual identification number, and an individual name with the corresponding tokenized values.

In some embodiments, the secure transfer system detokenizes a specific value of transaction requests (e.g., to provide a transaction request file to a fraud engine) in a modified transaction request file, where the specific value is replaced with a hashed value. The detokenized modified transaction request file with the hashed value may be sent to a fraud engine. The specific value may be a DFI account number, where the hashed DFI account number may be retrieved from a datastore using the identifier to replace the tokenized DFI account number in the modified transaction request file. In some embodiments, the secure transfer system provides for display, at a computing device, a graphical user interface with tokenized values of the modified transaction request file. The transaction request files may be formatted according to the National Automated House Association (NACHA) format.

The secure transfer system may generate one or more new transaction request files or new modified transaction request files based on a total number of transaction requests in a received transaction request file. In one example, the secure transfer system determines the total number of transaction requests in a modified transaction request file and compares the total number to a minimum request threshold. In response to determining that the total number is less than the minimum request threshold, the secure transfer system generates a new modified transaction request file by combining the transaction requests in the modified transaction request file with the transaction requests in one or more additional modified transaction request files such that the combined number of transaction requests is equal to or greater than the minimum request threshold.

In another example, the secure transfer system determines the total number of transaction requests in a modified transaction request file and compares the total number to a maximum request threshold. In response to determining that the total number is greater than the minimum request threshold, the secure transfer system generates new modified transaction request files by dividing the transaction requests in the modified transaction request file among the new modified transaction request files such that the number of transaction requests for each new file is less than the maximum request threshold.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 9 depicts a graphical user interface (GUI) for providing secured values of transaction request fields for display, in accordance with at least one embodiment.

DETAILED DESCRIPTION

The Figures (FIGS.) and the following description describe certain embodiments by way of illustration only. One skilled in the art will readily recognize from the following description that alternative embodiments of the systems and methods may be employed without departing from the principles described.

System Overview

Figure 1:
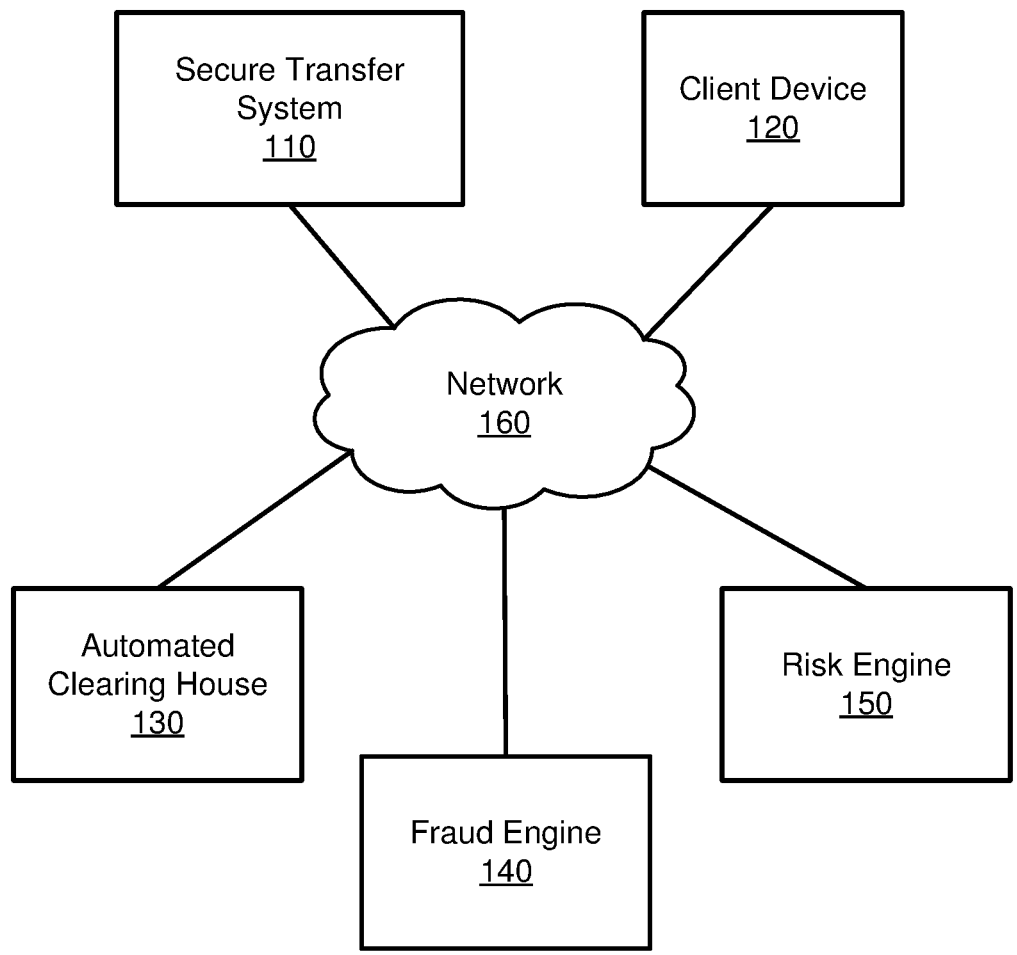
FIG. 1 illustrates one embodiment of a networked computing environment, in accordance with at least one embodiment.

FIG. 1 illustrates one embodiment of a networked computing environment 100, in accordance with at least one embodiment. In the embodiment shown, the networked computing environment 100 includes a secure transfer system 110, a client device 120, an automated clearing house 130, a fraud engine 140, a risk engine 150, and a network 160. In other embodiments, the networked computing environment 100 contains different or additional elements. For example, an originating depository financial institution (DFI) from which funds for transaction requests initiated by the client device are debited from may be included within the environment 100. In some embodiments, the secure transfer system 110 and the originating DFI may be collocated or performed by the same entity. For example, the secure transfer system 110 may be operated by a bank that also serves as the originating DFI for the client device 120. In addition, the functions may be distributed among the elements in a different manner than described.

The secure transfer system 110 may secure sensitive information received in transaction request files. In one example, the secure transfer system 110 secures information within a transaction request file (e.g., payroll file) such as amounts of money being transferred, the names of the payment recipients, unique identifiers of the recipients (e.g., social security numbers, employee ID numbers, etc.), the recipients' account numbers for receiving payments, or other types of personally identifiable information (PII). As referred to herein, the term "secured" refers to data that has been modified using a method of securing the data using cryptographic encryption techniques, a hashing algorithm, etc. unless otherwise specified from context.

In some embodiments, the secure transfer system 110 may secure sensitive information or provide access to the sensitive information depending on a destination to which the sensitive information is transmitted for subsequent processing. In one example, the secure transfer system 110 transmits secured information to the fraud engine 140. To check the validity of payment transfer requests, the fraud engine 140 may deduce patterns across the periodically received secured information, which requires a stable identifying value associated with the requests to determine whether an unexpected change in the requests has occurred. The secure transfer system 110 addresses this need by securing a stable identifying value associated with the requests using an operation (e.g., an SHA-224 hash) that produces, to a high level of mathematical confidence, a unique cryptographic representation of the identifying value. By using a hashed value instead of, for example, a tokenized (e.g., randomized) value, the secure transfer system 110 allows the fraud engine 140 to deduce patterns using the stable identifying value without having access to the underlying sensitive information.

Information exchanged in fulfilling a transaction request is often sensitive and while likely available for viewing by authorized users only (e.g., at a financial institution managing the transaction request processing), can be further secured by preventing unnecessary view of sensitive information by the authorized users. The secure transfer system described herein secures sensitive information exchanged in a transaction request as it is processed through the secure transfer system using a variety of security techniques. For example, the secure transfer system may tokenize sensitive information, where the tokenized information is made available to administrators of the secure transfer system, while storing an encrypted or hashed version of the sensitive information so that the information may be subsequently detokenized to provide to a particular destination (e.g., an automated clearing house). As referred to herein, "tokenization" is a process by which a data value of a given length is irreversibly (e.g., randomly) replaced with a non-sensitive value of the same length (i.e., an algorithm cannot invert the non-sensitive value back to the original data value).

Further, the secure transfer system 110 considers the destination of information when determining a one or more techniques to apply to secure the information and the portion of information to which the one or more techniques are applied. In one embodiment, the secure transfer system 110 uses a combination of tokenization, SHA-224 hashing, and symmetric-key cryptography to secure sensitive information in a transaction request.

The secure transfer system 110 may be used for payroll processing. For example, the secure transfer system 110 may receive a request from a client device initiating a request (i.e., transaction request) to provide payment to a recipient individual on the client's payroll. Information related to this transaction request may be provided to destinations such as an automated clearing house, a fraud engine, or a risk engine. The secure transfer system 110 may secure information related to the payment, client, or recipient individual using a variety of security techniques, which may depend on the destination to which the information is sent. The secure transfer system 110 is further described in the description of FIG. 2.

The client device 120 may be a conventional computer system, such as a desktop or a laptop computer. Alternatively, the client device 120 may be a device having computer functionality, such as a personal digital assistant (PDA), a mobile telephone, a smartphone, or another suitable device. The client device 120 is configured to communicate with the secure transfer system 110 via the network 160, for example using a native application executed by the client device 120 (e.g., an application providing functionality of the secure transfer system 110) or through an application programming interface (API) running on a native operating system of the computing device, such as IOS® or ANDROID™.

The client device 120 may transmit transaction request files having a predetermined formatting to the secure transfer system 110. For example, the client device 120 may transmit payroll files in National Automated Clear House Association (NACHA) format or International Organization for Standardization (ISO) format (e.g., ISO 20022). The transaction request files may include predetermined fields defined according to a particular format. For example, a transaction request file in the NACHA format may include fields such as a receiving DFI identification, check digit, depository financial institution (DFI) account number, amount, individual identification number, individual name, and trace number.

The client device 120 may encrypt the transaction request files before transmitting them to the secure transfer system 110. For example, the client device 120 may encrypt the payroll files using Pretty Good Privacy (PGP) encryption. The client device 120 may transmit the transaction request files using secured communication over the network 160 (e.g., Hypertext Transfer Protocol Secure or HTTPS). In another example, the client device 120 may transmit a PGP-encrypted payroll file over Secure Shell (SSH) File Transfer Protocol (SFTP). In some embodiments, the client device 120 and the secure transfer system 110 establish an agreed-upon encryption mechanism through which the transaction request files will be secured for communication over the network 160.

The automated clearing house 130, the fraud engine 140, and the risk engine 150 are destinations to which the transaction request information may be provided by the secure transfer system 110. The automated clearing house 130 may fulfill the transaction request initiated by the client device 120 by executing, clearing, and settling payments within a transaction request. For example, the automated clearing house 130 may be the United States Federal Reserve's FedACH to which the secure transfer system 110 transmits a payroll file for final execution, clearing, and settlement of each payment within the payroll file. In some embodiments, the automated clearing house 130 may initiate a return payment or notification of change (NOC) request. The request is received by the secure transfer system 110 and transmitted to the client device 120. In one example, a receiving DFI creates an NOC to notify an originating DFI that previously valid information contained in a payroll payment is no longer valid because the receiving DFI identification has been updated following a merger with another bank. The FedACH network may provide this NOC to the client device 120 via the secure transfer system 110, which may also credit a return payment to the originating DFI. The fraud engine 140 may apply rules or algorithms to determine whether transactions are fraudulent. The risk engine 150 may gather various statistics concerning the transactions, such as: a number of payments made to the receiving DFI, a number of payments made by the originating DFI, the sum total of the payments requested in a transaction request file, the number of returned payments by the receiving DFI, any suitable statistics related to the transaction requests for determining a level of risk for fraud or anti-money laundering (AML) scanning, or a combination thereof.

The network 160 may serve to communicatively couple the secure transfer system 110, the client device 120, the automated clearing house 130, the fraud engine 140, and the risk engine 150. In some embodiments, the network 160 includes any combination of local area or wide area networks, using wired or wireless communication systems. The network 160 may use standard communications technologies or protocols. For example, the network 160 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 160 may be encrypted using any suitable technique or techniques.

Figure 2:
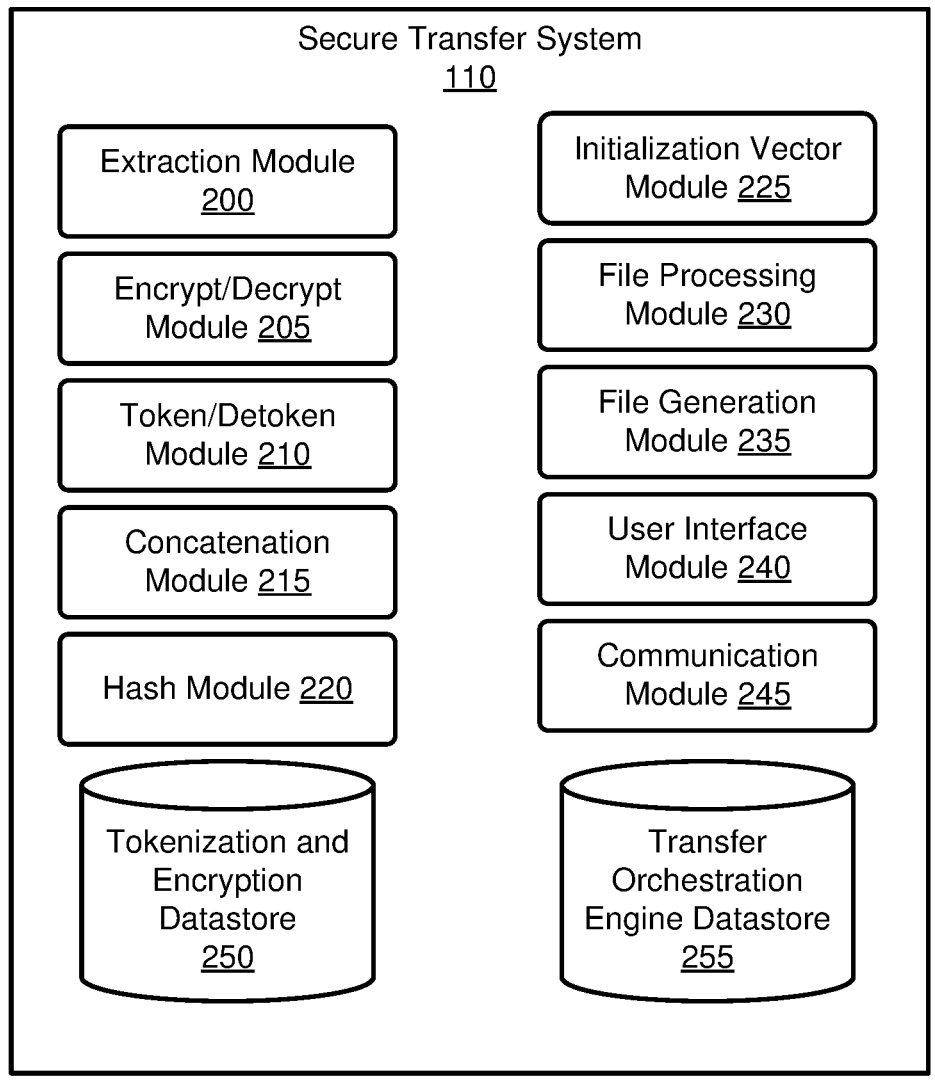
FIG. 2 is a block diagram of a secure transfer system of FIG. 1, in accordance with at least one embodiment.

FIG. 2 is a block diagram of the secure transfer system 110 of FIG. 1, in accordance with at least one embodiment. The secure transfer system 110 secures sensitive information of a transaction request file, stores the secured information, and provides additional security for retrieving the stored information. The secure transfer system 110 includes various software modules configured to tokenize, encrypt/decrypt, hash, or otherwise provide additional security for protecting the sensitive information within a transaction request file. The software modules include an extraction module 200, an encrypt/decrypt module 205, a token/detoken module 210, a concatenation module 215, a hash module 220, an initialization vector module 225, a file processing module 230, a file generation module 235, a user interface module 240, and a communication module 245. The secure transfer system 110 includes storage such as a tokenization and encryption datastore 250 and a transfer orchestration engine datastore 255. The datastores 250 and 255 may contain information related to transaction requests or information used to secure the transaction request information.

The secure transfer system 110 may have alternative configurations than shown in FIG. 2, including for example different, fewer, or additional components. The operations performed by modules of the secure transfer system 110 are not necessarily limited to certain modules, and one module may be capable of performing the operations of multiple modules shown. For example, while the concatenation module 215 is shown as an independent or distinct module, another module may be capable of performing the operations of the concatenation module 215 (e.g., having a concatenation sub-module).

The extraction module 200 extracts information in transaction request files received by the secure transfer system 110 (e.g., from the client device 120). A transaction request file may include transaction requests, which each may have a set of fields related to a requested transaction (e.g., an account to which funds of the transaction will be deposited). The received transaction request files may be in a predetermined format. For example, the files may be in a NACHA or ISO 20022 format. The extraction module 200 may parse a received file to verify whether the file is in an expected format for transaction request files. While NACHA and ISO 20022 are used as examples herein, any suitable format for transaction request files processable by an automated clearing house may be used and processed by the secure transfer system 110. The transaction request files may include payroll data and sensitive information related to a client's payroll. In some embodiments, the extraction module 200 receives returned transaction request files or NOCs (e.g., from the automated clearing house 130) containing sensitive information for extraction. This extraction may be similar to the extraction performed for transaction request files received from the client device 120 (e.g., due to a similar file format such as NACHA format).

A client device may encrypt the transaction request files before transmitting them to the secure transfer system 110. For example, the extraction module 200 may receive transaction request files via HTTPS or PGP-encrypted transaction request files over SFTP from the client device 120. In some embodiments, the secure transfer system 110 and the client device 120 may establish an pre-determined encryption mechanism (e.g., alternative to HTTPS or SFTP) for the transaction request files received by the extraction module 200. The extraction module 200 may decrypt the received transaction request files and parse the decrypted file, extracting sensitive information values based on the predetermined format. For example, the extraction module 200 may parse information such as receiving DFI identification based on the NACHA format for a Prearranged Payment and Deposit (PPD) Entry Detail Record, which specifies that the DFI identification is eight characters long and positioned from the fourth through eleventh characters of the PPD Entry Detail Record. A PPD Entry may be included in one example of a transaction request as referred to herein.

The encrypt/decrypt module 205 performs cryptographic encryption and decryption on information in the received transaction request files. The encrypt/decrypt module 205 encrypts sensitive information parsed by the extraction module 200. For example, the encrypt/decrypt module 205 applies a symmetric-key cryptographic block cipher to values of a set of fields in the received transaction request files. Symmetric-key cryptography is one example of a cryptographic algorithm for encrypting the sensitive data; the encrypt/decrypt module 205 may use any suitable reversible cryptographic algorithm. The set of fields in a received transaction request file that the encrypt/decrypt module 205 encrypts may include the account number of the receiving DFI, the payment recipient's identification number, and the payment recipient's name. These fields will be described herein according to the names specified by the NACHA format: DFI account number, individual identification number, and individual name, respectively. However, different or additional fields and field names may be used.

The encrypt/decrypt module 205 may apply symmetric-key cryptography to the untokenized values of these fields and store the encrypted values within the tokenization and encryption datastore 250. In some embodiments, the untokenized values are concatenated by the concatenation module 215 before the encrypt/decrypt module 205 applies symmetric-key cryptography to the concatenated values, which is then stored in the datastore 250. The encrypt/decrypt module 205 may receive an initialization vector (IV) generated by the initialization vector module 225 and apply the IV when encrypting the values. In this way, values of fields from which a pattern may be detected after decryption can be modified by the IV to prevent patterns from being produced when encrypting the values. In one example, the encrypt/decrypt module 205 uses an IV with the concatenated DFI account number, individual identification number, and individual name to prevent a dictionary-based or pattern-based attack on the encrypted and concatenated data stored within the datastore 250.

The encrypt/decrypt module 205 may specify that additional authenticated data (AAD) accompany the encrypted information. By specifying AAD, the encrypted information may be decrypted only when the proper AAD is presented. In some embodiments, the encrypt/decrypt module 205 uses certain fields from the payment file: an amount, DFI account number, receiving DFI identification number, and check digit. The values of the AAD fields may be stored in the tokenization and encryption datastore 250 and accessed when decryption is needed. If the AAD values are modified (e.g., because the datastore 250 is compromised), the encrypted information may be prevented from being decrypted; thus, providing another layer of security.

The encrypt/decrypt module 205 may apply a secret key, which may also be referred to as "a password," to encrypt values of transaction requests fields within the transaction request files. The encrypt/decrypt module 205 may store the secret key in a datastore separate from the datastore in which the encrypted information is stored. For example, the secret key may be stored in the transfer orchestration engine datastore 255. By separating the encrypted information from the secret key needed to decrypt the information, the secure transfer system 110 prevents undesired decryption of the sensitive information in case the datastore 250 is compromised. The transfer orchestration engine datastore 255 or any suitable sensitive location may be accessed only by specific personnel or processes with authorization to access the datastore. For example, the datastore 255 may be an isolated file system or in a software-based key vault or wallet.

The encrypt/decrypt module 205 decrypts the sensitive information it has previously encrypted before providing the decrypted information to a destination for payment processing (e.g., to the FedACH network). The encrypt/decrypt module 205 may access the encrypted information from a datastore. For example, the concatenated and encrypted values of the DFI account number, individual identification number, and individual name are retrieved from the tokenization and encryption datastore 250. Further, the encrypt/decrypt module 205 may retrieve the initialization vector used when encrypting the information or AAD values. This information retrieval may be facilitated using a primary key produced by the token/detoken module 210. The term "primary key" may also be referred to herein as an "identifier" unless otherwise specified by context.

In one example where information was encrypted using symmetric-key cryptography, the encrypt/decrypt module 205 may access the secret key stored in the transfer orchestration engine datastore 255 to decrypt the encrypted information. In some embodiments, the module 205 uses the retrieved initialization vector during decryption. The module 205 may decrypt the values using the secret key and the IV (e.g., as simultaneous inputs to the decryption algorithm) to obtain the untokenized values of the fields as provided by the client device 120. In some embodiments, the module 205 uses the AAD values when the information was encrypted to perform decryption. If the AAD values used during encryption match the values used during decryption, the module 205 will proceed to decrypt the encrypted values. In this way, if the tokenization and encryption datastore 250 is compromised and the AAD values modified, the secure transfer system 110 will prevent more data from being compromised by not decrypting the values.

The token/detoken module 210 tokenizes values of a subset of the transaction request fields within the transaction request files. The token/detoken module 210 may replace sensitive data within the transaction requests with randomized data. The tokenization may be irreversible, which strongly protects the sensitivity of tokenized values sent to destinations that do not necessarily require the untokenized value of certain fields within a transaction request. For example, the fraud engine 140 may not need an individual name or individual identification number (e.g., social security number) to determine whether there is fraudulent activity or money laundering occurring from the transaction request. In this example, the token/detoken module 210 may tokenize the individual name or individual identification number with randomized data. In addition, the irreversible tokenization provides security in the event that a datastore containing the tokenized information is compromised because the infiltrator is unable to determine the original value from the irreversible token.

The token/detoken module 210 may tokenize values of a set of transaction request fields including the individual name, the individual identification number, and the DFI account number. Once the module 210 tokenizes the values, the tokenized values may be concatenated together by the concatenation module 215. The module 210 may store the tokenized and concatenated values into the tokenization and encryption datastore 250. This stored value may be used by the secure transfer system 110 as a primary key for the corresponding transaction request to which the tokenized values belong. That is, the primary key may be used to look up a representation, which may include an encrypted representation of untokenized values or encryption objects for detokenizing the representation of the corresponding transaction request from the tokenization and encryption datastore 250 for further processing (e.g., decryption) before transmitting a modified transaction request file with the values to a destination (e.g., the FedACH network).

This lookup may be part of the process for detokenizing, whereby the secure transfer system 110 replaces tokenized values with corresponding untokenized values. Since the process of tokenization is irreversible, the secure transfer system 110 obtains untokenized values by decrypting the hashed or encrypted versions of those tokenized values. In the example where the tokenized values include the DFI account number, individual identification number, and individual name, these values may also be secured using one or more of a hash (e.g., using the hash module 220) or encryption (e.g., symmetric-key cryptographic block cipher encryption as applied by the encrypt/decrypt module 205). In a detokenization process, the token/detoken module 210 may retrieve the secured values from the tokenization and encryption datastore 250. For example, a transaction request file including representations (e.g., secured representations) of the untokenized values are retrieved.

The token/detoken module 210 may regenerate a primary key created from the tokenized values in a retrieved representation. The module 210 may use the primary key to query the datastore 250 for encrypted values related to a given transaction request and encryption objects used to detokenize the encrypted values. The encryption objects may include one or more of a decryption block cipher value (e.g., a symmetric-key cryptographic block cipher value), AAD, or an initialization vector. The encryption objects may be used to encrypt the values of transaction request fields just as they are used to decrypt the values. The secure transfer system 110 may then proceed to decrypt the retrieved values to obtain the detokenized values (e.g., the values extracted and decrypted by the extraction module 200).

The token/detoken module 210 may tokenize values from files received from a client or a destination. For example, the token/detoken module 210 may tokenize a DFI account number as included in a transaction request file transmitted by the client device 120. In another example, the token/detoken module 210 may tokenize an individual name as received from a receiving DFI (e.g., the payment recipient's bank). The payment recipient may have changed their name and the client device 120 may have provided the previous name to the Originating Depository Financial Institution (ODFI or originating DFI) to fulfill the transaction request with the receiving DFI. The receiving DFI may create an NOC with the updated name and the secure transfer system 110 facilitates the receiving DFI in providing the NOC to the client device 120, tokenizing the updated name when transferring this data.

The concatenation module 215 concatenates values of requests within a transaction request file together. In one example, the concatenation module 215 concatenates a request's tokenized values of the DFI account number, individual identification number, and individual name (e.g., as tokenized by the token/detoken module 210). The concatenation module 215 may provide this concatenated value (i.e., the primary key) to the tokenization and encryption datastore 250 for storage. In another example, the concatenation module 215 concatenates decrypted values of the DFI account number, receiving DFI identification, and check digit (e.g., as extracted and decrypted by the extraction module 200). This concatenated value may be provided to the hash module 220 for hashing and subsequent storage into the datastore 250. In yet another example, the concatenation module 215 concatenates decrypted values of the DFI account number, individual identification number, and the individual name (e.g., as extracted and decrypted by the extraction module 200). This concatenated value may be provided to the encrypt/decrypt module 205 for encryption and subsequent storage into the datastore 250.

The hash module 220 applies a hashing algorithm to one or more values of transaction request fields within the transaction request file to secure the values. The values may be concatenated before the hash module 220 applies the hashing algorithm. The hash module 220 may use a hashing algorithm such as SHA-224 or any other suitable cryptographic hash function. In some embodiments, the hash module 220 applies a SHA-224 hash to a concatenated value of the DFI account number, receiving DFI identification, and check digit. The hash module 220 may store this secured value into the tokenization and encryption datastore 250.

By applying a hashing algorithm, the hash module 220 enables certain transaction request fields of transaction request files to be mapped with a consistent value (i.e., a hash digest) that may be used to track patterns associated with the fields. For example, the fraud engine 140 may require that the DFI account number be consistent over the history of that account (e.g., between payroll payments). A SHA-224 hash may increase the likelihood that the hashed value for the DFI account number will be consistent over payroll payments, and increase collision resistance with other DFI account numbers at other banks or DFI's. In particular, the hash module 220 may use a collision resistant hashing algorithm to decrease the likelihood that the consistent hash value serves, for example, as the same identifying value for two different payment recipients' DFI account numbers.

The initialization vector module 225 generates an initialization vector. The IV may be used to prevent a dictionary-based or pattern-based attack on the values encrypted by the encrypt/decrypt module 205. The IV may be used with a secret key by the encrypt/decrypt module 205 for the symmetric-key cryptographic block cipher. The value of the IV may be changed with each encryption of values (e.g., the concatenated DFI account number, the individual identification number, and the individual name). The value of the IV may be changed with each transaction request file received by the secure transfer system 110, changed according to a predetermined frequency (e.g., daily), or changed based on a user request (e.g., an administrator of the secure transfer system 110). The value of the IV may be an arbitrary number (e.g., generated by a pseudorandom number generator). The length of the IV may be comparable to the length of the symmetric-key cryptographic block cipher.

The file processing module 230 may process the information within received transaction request files. In some embodiments, after the secure transfer system 110 has encrypted, hashed, or tokenized values of transaction request fields of requests within a transaction request file, the file processing module 230 may process the secured data in addition or alternatively to the decrypted records extracted by the extraction module 200.

The file processing module 230 may perform validation on each payment within the transaction request file. The validation may include formatting, syntax checks, or any suitable type of validation for file formatting for payment processing. The file processing module 230 may transmit a request to a credit check service of the account from which the payment is being debited. For example, the file processing module 230 may contact a credit check service associated with the client of the client device 120 to verify that the client's account contains sufficient funds in order to pay the beneficiaries listed within the transaction request file.

The file processing module 230 may record fund movements as detailed in the received transaction request files in an electronic ledger. The file processing module 230 determines a total of funds debited from the client's account (i.e., the total of the transaction requests within the received files). The file processing module 230 then enters this sum as a debit entry against the client's account in the electronic ledger. The file processing module 230 may store one or more values of the transaction request files in the transfer orchestration engine datastore 250 for audit, tracking, reporting, or reconciliation purposes. The stored values may include tokenized values output from the token/detoken module 210. By storing the tokenized values, the sensitive information is secured in the event that the datastore 250 is compromised.

In some embodiments, the file generation module 235 receives a file that includes secured values and creates multiple new files using this received file. For example, the received file may include a number of transaction requests exceeding a predetermined maximum request threshold (e.g., one hundred transaction requests). The file generation module 235 may divide the received file into multiple new files, each new file containing a number of transaction requests that does not exceed the predetermined maximum request threshold. The file generation module 235 may generate a file that includes tokenized values of at least an individual identification number and individual name. For example, a hashed value of a DFI account number may be included in the generated file when the generated file is provided to the fraud engine 140 rather than a tokenized value of the DFI account number in the generated file when it is provided to the risk engine 150.

The file generation module 235 may determine that the number of transaction requests within a received file does not meet a predetermined minimum request threshold (e.g., ten transaction requests). The file generation module 235 may determine not to proceed with further processing for the received file until one or more subsequently received files causes the total number of transaction requests among the received transaction request files meets the predetermined minimum request threshold. After the file generation module 235 determines that the number of transaction requests received meets the minimum request threshold, the file generation module 235 may combine the transaction requests in the received files into a newly generated file for further processing (e.g., by the secure transfer system 110).

For risk reporting, the file generation module 235 may generate a transaction request file including tokenized values of the individual name, the individual identification number, and the DFI account number. In an example where the risk engine 150 does not necessarily require an identifying value associated with a beneficiary's transaction requests to be consistent over time, the risk engine 150 may analyze a risk associated with the transaction requests or gather statistics associated with the transaction requests as required by NACHA rules and regulations. For this example, the risk engine 150 can perform these operations with tokenized values of the individual name, the individual identification number, and the DFI account number and with decrypted values of a transaction amount, receiving DFI identification, check digit, and trace number.

For fraud or AML checks, the file generation module 235 may generate a transaction request file including requests including hashed values of respective DFI account numbers.

In some embodiments, the file generation module 235 may extract certain tokenized values from a transaction request file. For example, the file processing module 230 may extract tokenized individual name, the individual identification number, and the DFI account number of each transaction request within a file. The file processing module 230 may concatenate these values to form a primary key to look up the hashed value of a DFI account number for the corresponding transaction request in the tokenization and encryption datastore 250. This file processing module 230 may then generate a transaction request file containing hashed DFI account numbers, tokenized individual names, and tokenized individual identification numbers for respective transaction requests in the processed file. The newly generated files may be in a predetermined format acceptable for processing by an automated clearing house (e.g., NACHA formatting).

By using a hashing algorithm, the hashed account number may remain the same throughout its history (i.e., the time that the account number is valid) while separating the encrypted value from a specific beneficiary to protect the beneficiary's privacy. This is practical for fraud and AML checks since, for example, the fraud engine 140 may use a set of rules that rely upon a consistent account value to identify abnormal transactions over time for the account. For files sent for fraud or AML checks, the file generation module 235 may include a tokenized value of the individual identification number or the individual name. This may be applicable for checks performed by the fraud engine 140 that do not rely upon a consistent identifying value for the individual identification number or the individual name to determine if there is fraudulent activity in the transaction requested.

The user interface module 240 provides a graphical user interface (GUI) for display at a device of an administrator associated with the secure transfer system 110. In one example, the secure transfer system 110 is managed by a bank and the administrator may be an employee of the bank who is authorized to access values of transaction request files processed by the secure transfer system 110. The user interface module 240 may display values of transaction request files on a GUI such that the sensitive information is substituted with a secured value (e.g., a tokenized value). For example, the user interface module 240 displays the tokenized value of the individual names of the transaction requests output by the token/detoken module 210 rather than the true names. In this way, the administrator cannot discern which beneficiary is receiving which payment and the beneficiary's sensitive information is protected. The user interface module 240 may also provide a GUI with user inputs for interacting with the values of the transaction request fields (e.g., exporting the secured values for auditing). One example of a GUI provided for display by the user interface module 240 is depicted in FIG. 9.

The communication module 245 transmits files generated by the secure transfer system 110 (e.g., the file generation module 235) to a destination for payment processing. The destination may be the automated clearing house 130 to fulfill the transaction request, transferring a specified payment amount from an originating DFI to a receiving DFI. The destination may be the fraud engine 140 to perform one or more checks to reduce the likelihood of fraudulent activity within the transaction request. The destination may be the risk engine 150 to report information within the transaction request files for required monitoring (e.g., per NACHA rules and regulations). The destination may be the client device 120 to return payments transmitted to the secure transfer system 110 by the automated clearing house 130. The communication module 245 may transmit a file including a NOC generated by a receiving DFI to the client device 120. The communication module 245 may receive transaction request files from the client device 120. The communication module may implement an encrypted communication method for transferring sensitive information (e.g., HTTPS or SFTP). The communication module may include or interface with hardware (e.g., wireless circuitry or wired networking connections) for communication over the network 160.

The tokenization and encryption datastore 250 may include one or more non-transitory computer-readable media configured to store values of transaction request fields of the transaction request files. The stored values may have been secured by the secure transfer system 110 (e.g., by the encrypt/decrypt module 205, token/detoken module 210, or the hash module 220). For example, the datastore 250 may store tokenized values of the DFI account number, the individual identification number, and the individual name. The datastore 250 may alternatively or additionally store hashed values of the DFI account number, receiving DFI identification, and check digit. The datastore 250 may alternatively or additionally store encrypted values of the DFI account number, the individual identification number, and the individual name. The datastore 250 may store a primary key used to query and retrieve the secured data within the datastore 250. The secured data may be keyed to a combination of the tokenized version of the secured data's original values. For example, the datastore 250 may store a primary key produced by tokenizing and concatenating the values DFI account number, individual identification number, and individual name fields. The datastore 250 may store initialization vectors generated by the initialization vector module 225. The secure transfer system 110 may access the datastore 250 to detokenize certain values and generate transaction request files with the detokenized values (e.g., to provide to the automated clearing house 130).

The transfer orchestration engine datastore 255 includes one or more non-transitory computer-readable media configured to store the values of transaction request fields for audit, tracking, reporting, or reconciliation. One or more of the values may be tokenized (e.g., using the token/detoken module 210) to provide additional security should the transfer orchestration engine datastore 255 be compromised. The transfer orchestration engine datastore 255 may store secret keys used for encryption of the values. For example, the encrypt/decrypt module 205 may store the secret key used in symmetric-key cryptographic block cipher applied by the encrypt/decrypt module 205.

Data Transfer Flows

Figure 3:
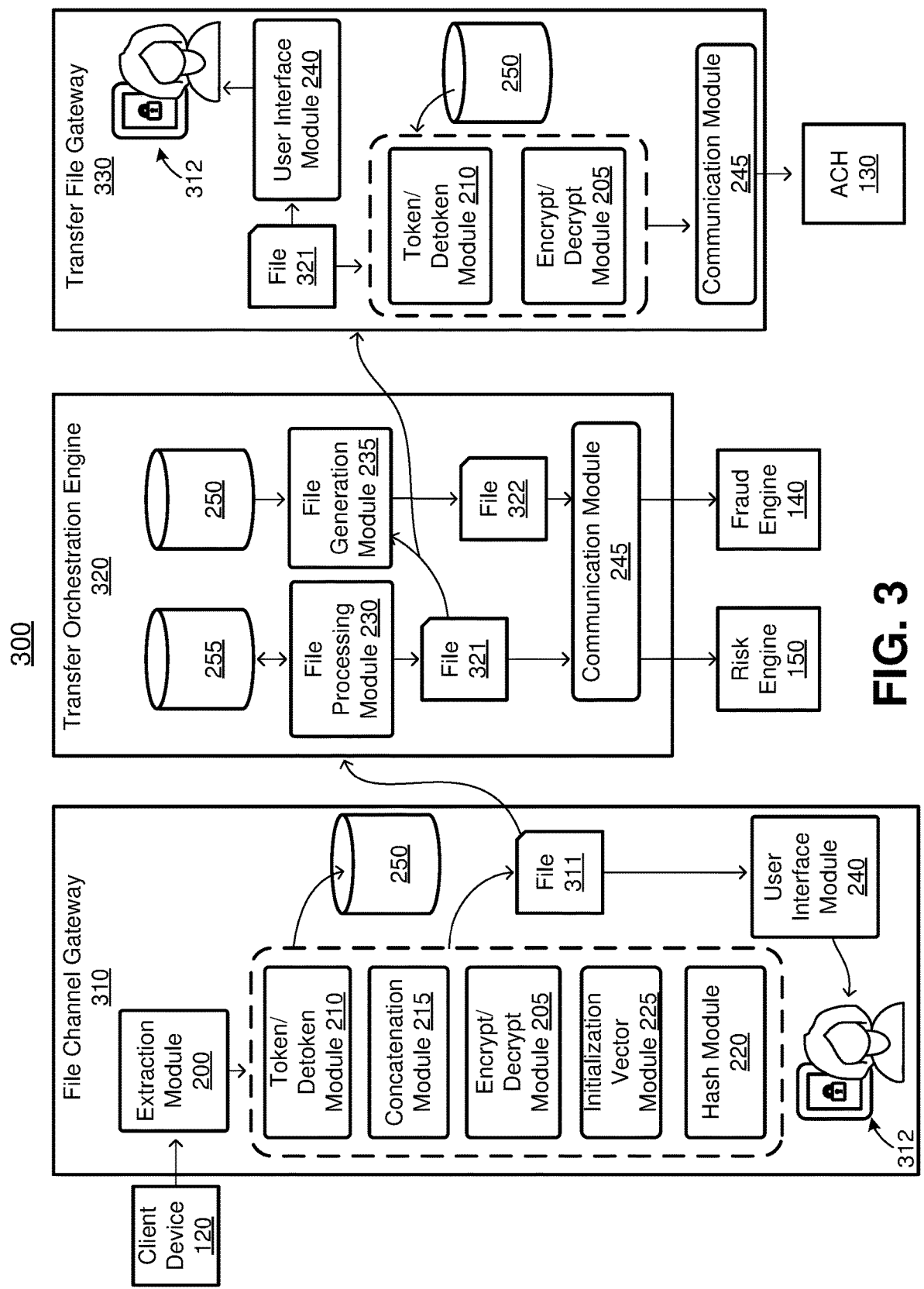
FIG. 3 depicts a block diagram of a data transfer flow from a client device to an automated clearing house of FIG. 1, in accordance with at least one embodiment.

FIG. 3 depicts a block diagram of a data transfer flow 300 from the client device 120 to the automated clearing house 130 of FIG. 1, in accordance with at least one embodiment. The data transfer flow 300 may be performed by the secure transfer system 110. The data transfer flow 300 may be performed by different subsystems of the secure transfer system 110: the file channel gateway 310, the transfer orchestration engine 320, and the transfer file gateway 330. In some embodiments, the subsystems may represent a partitioning of software or hardware modules. For example, the file channel gateway 310 may be executed by a first computing device, the transfer orchestration engine 320 may be executed by a second computing device, etc. In some embodiments, the subsystems may represent a logical partitioning of operations performed by the secure transfer system 110. For example, the secure transfer system 110 is maintained and executed by a remote server that performs the operations of the gateway 310, the engine 320, and the gateway 330.

The data transfer flow 300 may be an example process by which the secure transfer system 110 facilitates transaction requests initiated by the client device 120 and fulfilled by the automated clearing house 130. The file channel gateway 310 receives a transaction request file from the client device 120. The file channel gateway 310 performs operations to secure the sensitive information within the received transaction request file. The file channel gateway 310 performs these operations using the extraction module 200, the token/detoken module 210, the concatenation module 215, the encrypt/decrypt module 205, the initialization vector module 225, and the hash module 220. The file channel gateway 310 may store the secured information in the tokenization and encryption datastore 250. In some embodiments, the file channel gateway 310 displays a generated file with secured information to an administrator device 312 via the user interface module 240.

The file channel gateway 310 may receive a transaction request file containing, for example, payroll data. The transaction request file may be a NACHA or ISO-formatted (e.g., ISO 20022) file. The client device 120 may encrypt the file before sending the file to the secure transfer system 110. The file may be communicated over a network (e.g., the network 160) using HTTPS, PGP-encryption over SFTP, or any other agreed-upon mechanism between the client device and the secure transfer system 110.

The file channel gateway 310 (e.g., the extraction module 200) decrypts the received file and parses the file to verify that the file is in a proper format (e.g., NACHA or ISO 20022). The file channel gateway 310 (e.g., the token/detoken module 210) tokenizes a subset of the fields of a transaction request in the file. For example, the token/detoken module 210 replaces the original values of the individual name, individual identification number, and the DFI account number with respective random data values. This process of tokenization may not be reversed if the file is compromised or stolen by a malicious user or infiltrator. The file channel gateway 310 (e.g., the concatenation module 215) may concatenate and then store the tokenized data into the tokenization and encryption datastore 250. This concatenated value may act as a primary key for the corresponding payment in the file and may be used to lookup secured values and encryption objects within the datastore 250 to detokenize the secured values.

In addition to tokenizing values of transaction request fields, the file channel gateway 310 may concatenate and hash the values of certain transaction request fields. For example, the concatenation module 215 concatenates the DFI account number, the receiving DFI identification, and the check digit for the receiving DFI identification. Then, the hash module 220 may apply a SHA-224 hash to the concatenation and store the hashed concatenation into the tokenization and encryption datastore 250. One benefit of this hash is that the DFI account number is cryptographically secure since the hashing operation cannot be reversed. The SHA-224 hash may decrease the likelihood that two account numbers and bank details are hashed to the same value for two different beneficiaries (i.e., a cryptographically collision resistant hash).

The file channel gateway 310 may concatenate and apply encryption to values of certain transaction request fields. For example, the concatenation module 215 concatenates the DFI account number, the individual identification number, and the individual name. Then, the encrypt/decrypt module 205 may apply a symmetric-key cryptographic block cipher to the concatenation and store the encrypted concatenation to the tokenization and encryption datastore 250. During encryption, the encrypt/decrypt module 205 may access a secret key for input into the symmetric-key cryptographic block cipher. The secure transfer system 310 may store the secret key within a datastore other than the datastore containing the encrypted values. For example, the secure transfer system 110 stores the secret key within the transfer orchestration engine datastore 255. Thus, the secure transfer system 110 may prevent the secured values within the datastore 250 from being decrypted in the event that the datastore 250 is compromised.

The file channel gateway 310 may also store certain values of the transaction request files to the tokenization and encryption datastore 250 as AAD for the symmetric-key cryptographic block cipher. The AAD values may enable the secure transfer system 110 to verify that the values in the tokenized transaction request file have not changed during the processing of the file by the transfer orchestration engine 320 (e.g., during the decryption operation of detokenization by the transfer file gateway 330). The AAD values thus provide authentication or integrity of the original payment transactions. In some embodiments, the AAD values may include the amount, the DFI account number, the receiving DFI identification, and the check digit.

The file channel gateway 310 may generate a random initialization vector. For example, the initialization vector module 225 generates a random IV to decrease the likelihood that the encrypt/decrypt module 205 produces the same ciphertext for the same sequence of text. For example, the encrypt/decrypt module 205 may apply the generated IV with a symmetric-key cryptographic block cipher to increase the likelihood that the same payment details yield different ciphertext outputs in the case of any payroll rerun. The initialization vector module 225 thus enables the secure transfer system 110 to prevent a dictionary-based or pattern-based attack on the tokenization and encryption datastore 250. The initialization vector module 225 may store the generated IV into the datastore 250.

After the file channel gateway 310 secures values of the transaction request file, the file channel gateway 310 may produce a resultant file that includes the secured values in place of the original, untokenized values. The file channel gateway 310 may allow an administrator of the secure transfer file 110 to access and view the secured values. For example, the user interface module 240 provides information within a resultant file 311 for display at an administrator device 312. The administrator device 312 may be any suitable computing device for receiving the secured values and providing them for display. The user interface module 240 provides a GUI for display that shows the secured values. Thus, an administrator will not be able to discern the sensitive information, such as which beneficiary is receiving which payment, within transaction request files.

The transfer orchestration engine 320 performs various operations on the secured values within the transaction request files generated by the file channel gateway 310. For example, the file processing module 230 may perform validations on one or more transaction requests, transmit a query to a credit check service to verify that the account from which payment is being debited contains sufficient funds to fulfill the transaction requests in a file, record the payments requested in an electronic ledger, or store transaction request values in the transfer orchestration engine datastore 255 for subsequent audit. The file processing module 230 may generate a file 321 including tokenized values of the DFI account numbers, individual names, and individual identification numbers. The file 321 may be in NACHA format. The file processing module 230 may provide the file 321 to the file generation module 235 or the communication module 245. The file generation module 235 may generate one or more new transaction request files using the values within the file 321. The communication module 245 may transmit the file 321 to the risk engine 150 to track and analyze statistics of the transaction request file (e.g., the number of payments made to the receiving DFI identification). The file processing module 230 may provide the file 321 to the transfer file gateway 330 for detokenization to transmit to an automated clearing house to fulfill the transaction requests. In some embodiments, the file processing module 230 may provide the file 321 to the transfer file gateway 330 responsive to receiving a notification from the fraud engine 140 indicative that fraudulent or otherwise unwanted activity is absent from the transaction requests within the file 321.

In some embodiments, the transfer orchestration engine 320 generates one or more new transaction request files. For example, the file generation module 235 determines a number of new transaction request files to generate by comparing the number of transaction requests within the received file 321 to one or more thresholds for numbers of transaction requests. One such threshold may be a predetermined maximum request threshold. The file generation module 235 may determine a number of transaction requests within the file 321 and compare it to the predetermined maximum request threshold. If the number of transaction requests exceeds the maximum, the file generation module 235 may split the file 321 into one or more new transaction request files such that each new transaction request file contains at most the number transaction requests corresponding to the maximum request threshold. Another such threshold may be a predetermined minimum request threshold. The file generation module 235 may determine that the number of transaction requests within the file 321 does not meet the predetermined minimum request threshold and in response, receive one or more additional transaction request files to combine into a new transaction request file whose number of transaction requests meets the predetermined minimum request threshold. Although a new file 322 is shown as being generated from the file 321, there may be more than one file received by the file generation module 235 to produce the file 322 or more than one file produced by the file generation module 235 in addition to the file 322.

The file generation module 235 may parse the transaction requests within the file 322 to extract and concatenate the tokenized values of the individual name, the individual identification number, and the DFI account number. The file generation module 235 may query the tokenization and encryption datastore 250 using the resultant concatenation to retrieve the hashed value of the DFI account number. This query may return the SHA-224 hash value representing the original DFI account number, and the SHA-224 hash value may be included within the file 322. The file generation module 235 may transmit at least the file 322 to the communication module 245, which may provide the file 322 to the fraud engine 140 for evaluation of whether the transaction requests within the file 322 are fraudulent. In some embodiments, the file generation module 235 provides the file 322 to the transfer file gateway 330 alternative to the file 321 being provided to the transfer file gateway 330.

The SHA-224 secured value may be used to scan the transaction request for fraud (e.g., by the fraud engine 140). The communication module 245 may provide secured values of sensitive data to the fraud engine 140. For example, the communication module 245 provides a version of the original NACHA PPD Entry Detail Record received at the file channel gateway 310 that replaces the original, untokenized value of the DFI account number with the hashed account number. Since the fraud engine 140 may require that the account number be consistent over the account's history, hashing the DFI account number enables this consistency while adding protection in the event that the payroll file is compromised or stolen (i.e., the account number cannot be un-hashed).

The transfer file gateway 330 receives the file 321 or although not depicted, the file 322 from the transfer orchestration engine 320 to detokenize secured values within the file and transmit the detokenized transaction request file to the automated clearing house 130. The transfer file gateway 330 may use the token/detoken module 210 to detokenize the secured values. The token/detoken module 210 may detokenize each transaction request or entry within the file 321. The term "entry" may also be referred to as "a representation of the untokenized values" herein unless otherwise specified by context. For example, a NACHA PPD Entry is an entry of a specific format for organizing transaction request information and does not necessarily refer to a representation of untokenized values.

The token/detoken module 210 may extract the individual name, individual identification number, and DFI account number to concatenate and serve as the primary key for querying the tokenization and encryption datastore 250. Since this concatenated value may be the primary key for each transaction request in the file, exactly one representation of untokenized values may be returned during this query for each request in the file 321. Furthermore, one set of encryption objects corresponding to the representation may be returned. The encryption objects returned from the datastore 250 may include the AAD values and the initialization vector. The encrypted values may be the symmetric-key cryptographic block cipher values produced by the encrypt/decrypt module 205 at the file channel gateway 310. The AAD values may be the amount, DFI account number, receiving DFI identification, and check digit as designated by the file channel gateway 310 as the AAD values. The IV may be produced by the initialization vector module 225 at the file channel gateway 310.

The values within the entry returned may be used by the encrypt/decrypt module 205 as input for symmetric-key cryptographic block cipher decryption. The transfer file gateway 330 may replace the tokenized values within the file 321 with the decrypted values. The resultant transaction request file with the original values (e.g., of the individual name, individual identification number, and DFI account number) may be provided to the communication module 245 for transmission to the automated clearing house 130 for final payment execution, clearing, and settlement. In some embodiments, the transfer file gateway 330 may provide the file 321 for display using the user interface module 240 to the administrator device 312. This display is secured, as the sensitive information within the transaction request file is tokenized. FIGS. 4-7 depict the data transfer flow 300 at the value-level.

Figure 4:
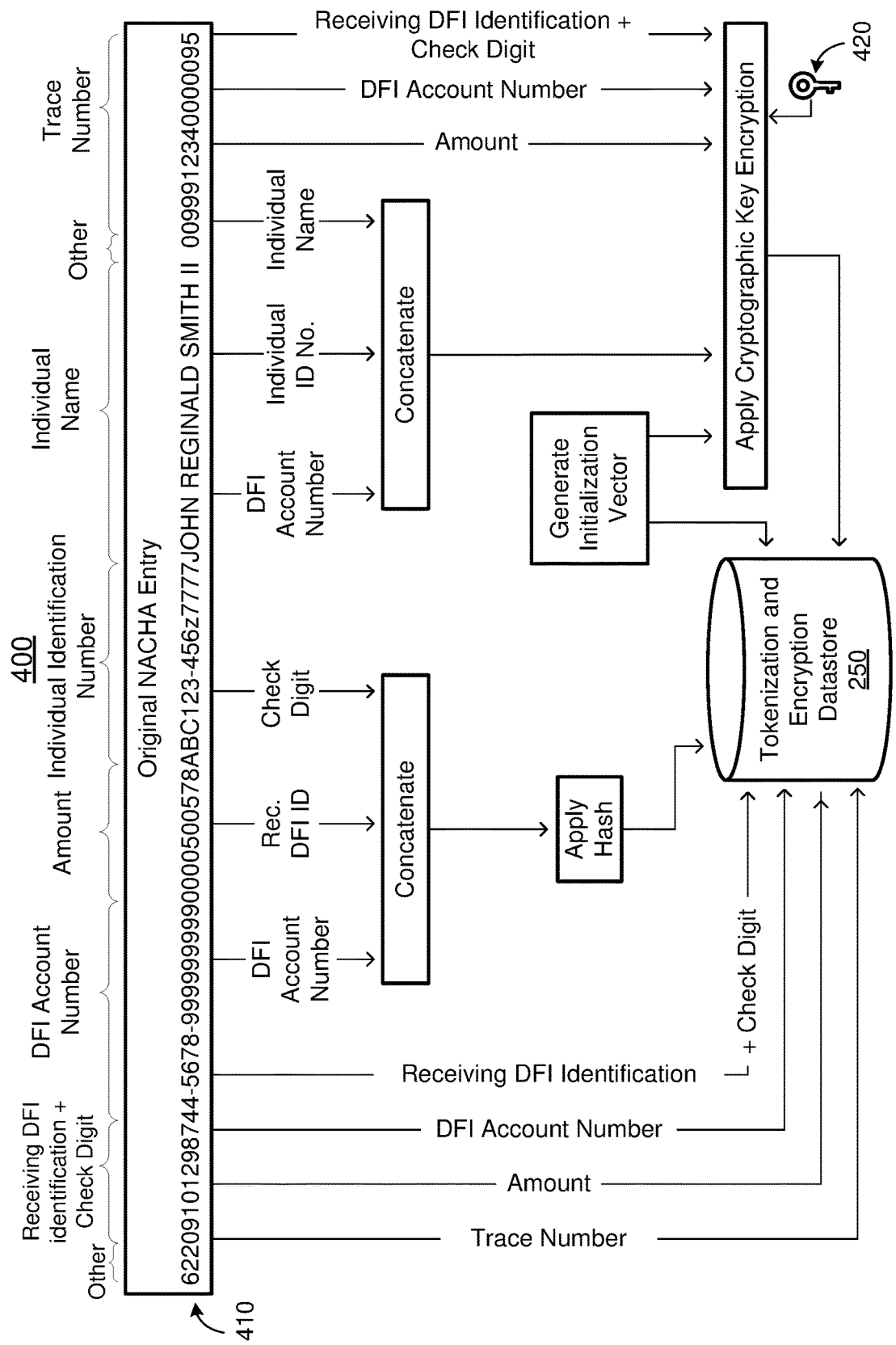
FIG. 4 is a diagram of a value-level data flow of encryption and hashing from an original NACHA Entry received by a secure transfer system, in accordance with at least one embodiment.

FIG. 4 is a diagram of a value-level data flow 400 of encryption and hashing from an original NACHA Entry received by a secure transfer system, in accordance with at least one embodiment. The transaction request file may include one or more original NACHA PPD Entries such as an original NACHA Entry 410. The original NACHA Entry 410 includes values for a receiving DFI identification ("09101298"), check digit ("7"), DFI account number ("44-5678-999999999"), amount ("0000500578"), individual identification number ("ABC123-456z7777"), individual name ("JOHN REGINALD SMITH II"), and a trace number ("099912340000095"). The original NACHA Entry 410 follows the NACHA format and thus, has a predetermined length (i.e., 94 characters long) and contains fields labeled as "Other" in FIG. 4, where the values of these fields are not necessarily used by the secure transfer system 110 to secure sensitive data within the Entry. The secure transfer system 110 may implement the data flow 400. For example, the extraction module 200 may parse the transaction request file to extract the values within the original NACHA Entry 410 and provide the extracted values to other modules within the secure transfer system 110.

As depicted in the data flow 400, the receiving DFI identification, check digit, DFI account number, amount, and trace number are stored within the tokenization and encryption datastore 250. These values may be used as AAD by the encrypt/decrypt module 205. Further in the data flow 400, the DFI account number, receiving DFI identification, and check digit are concatenated and a hash algorithm (e.g., SHA-224 hash) is applied to the concatenation. This may be performed by the concatenation module 215 and hash module 220 of the secure transfer system 110. The hashed concatenation is then stored within the tokenization and encryption datastore 250. The DFI account number, individual identification number, and individual name may be concatenated and encrypted by the encrypt/decrypt module 205. The encrypt/decrypt module 205 may apply a random initialization vector and AAD to a symmetric-key cryptographic block cipher encryption using a secret key 420. The concatenated and encrypted value may be stored within the datastore 250.

Figure 5:
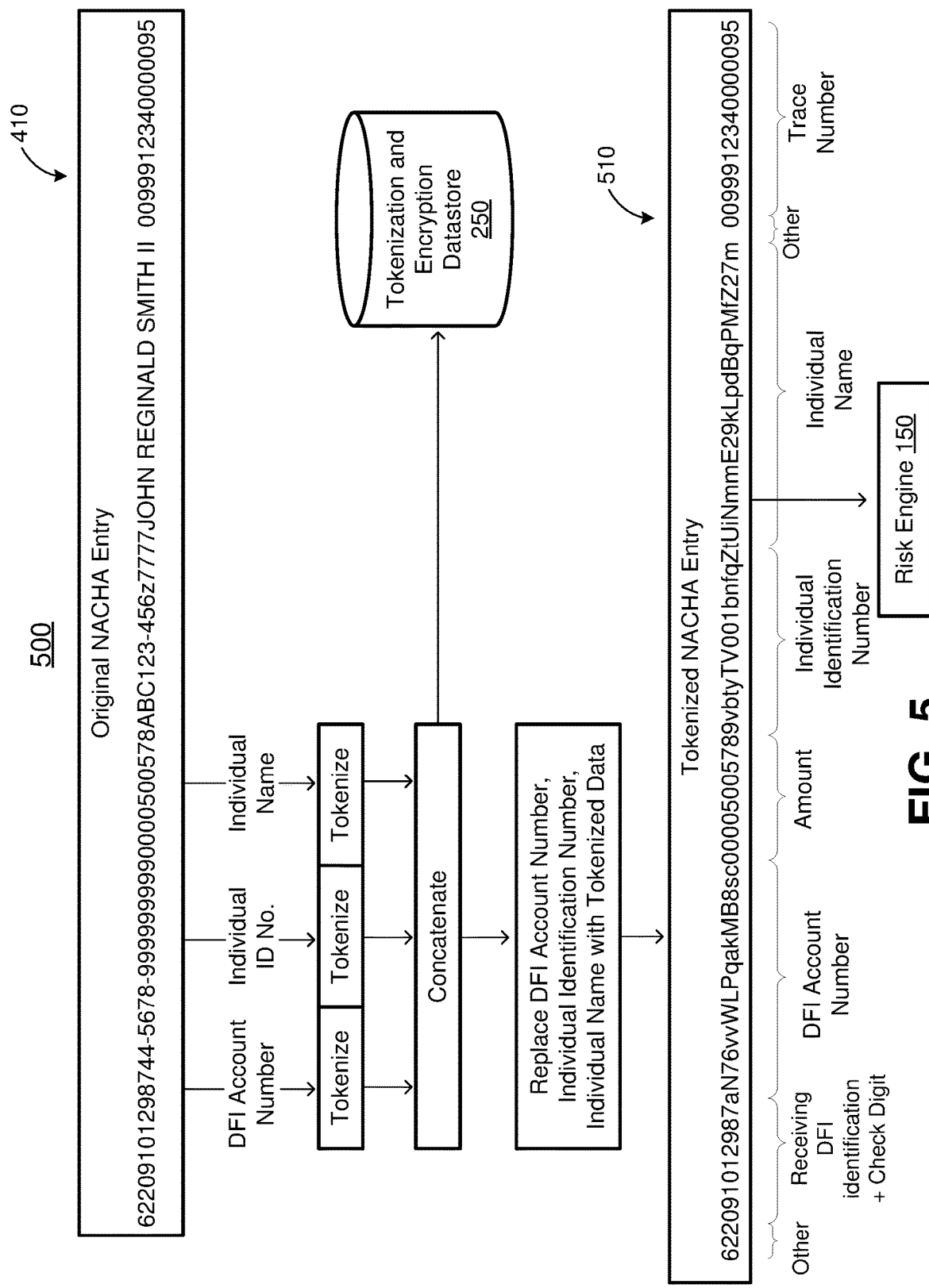
FIG. 5 is a diagram of a value-level data flow of tokenization from an original NACHA Entry, in accordance with at least one embodiment.

FIG. 5 is a diagram of a value-level data flow 500 of tokenization from the original NACHA Entry 410 of FIG. 4, in accordance with at least one embodiment. The DFI account number, individual identification number, and individual name are each tokenized (e.g., by the token/detoken module 210) and concatenated. The tokenized and concatenated value may be stored within the tokenization and encryption datastore 250. The secure transfer system 110 may produce a tokenized NACHA Entry 510 from the values within the original NACHA Entry 410 by replacing the values of the DFI account number, individual identification number, and the individual name within the original NACHA Entry 410 with the tokenized versions of the corresponding values. Although depicted in the data flow 500 as following the concatenation, this replacement of sensitive information with tokenized values may occur subsequent to the tokenization (i.e., prior to the concatenation). As shown in the tokenized NACHA Entry 510, the DFI account number, individual identification number, and individual name have been tokenized to "aN76vvWLPqakMB8sc," "9vbtyTV001bnfqZ," and "tUiNmmE29kLpdBqPMfZ27m," respectively. The secure transfer system 110 transmits the tokenized NACHA Entry 510 to the risk engine 150.

Figure 6:
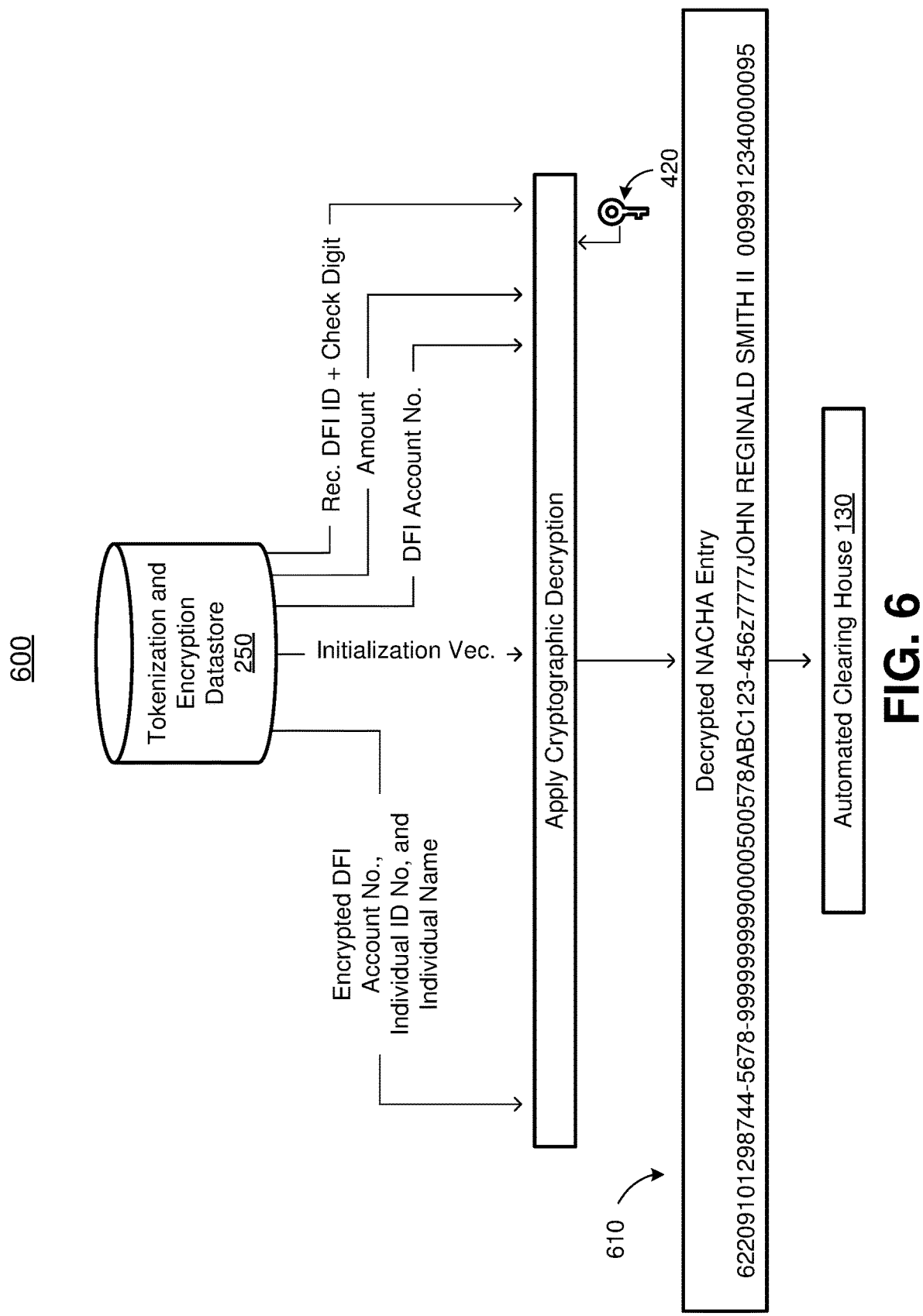
FIG. 6 is a diagram of a value-level data flow for detokenizing a secured NACHA Entry, in accordance with at least one embodiment.

FIG. 6 is a diagram of a value-level data flow 600 for detokenizing a secured NACHA Entry (e.g., the Entry of FIGS. 4 and 5), in accordance with at least one embodiment. The secure transfer system 110 queries the tokenization and encryption datastore 250 using a concatenation of one or more tokenized values (i.e., a primary key). For example, the primary key may be the concatenation of the tokenized individual name, individual identification number, and the DFI account number. The entry returned from the datastore 250 includes an encrypted value of one or more values. For example, the encrypted value may be a symmetric-key cryptographic block cipher value including the encrypted concatenation of the DFI account number, individual ID number, and the individual name. The returned entry may further include an initialization vector and one or more AAD values used during the encryption. The AAD values may include the receiving DFI identification, check digit, amount, and DFI account number. The encrypt/decrypt module 205 may use the contents of the retrieved entry and the secret key 420 (i.e., the key used to encrypt the sensitive information) for symmetric-key cryptographic block cipher decryption. Although not depicted, in the case of asymmetric encryption, a different key may be retrieved. The result of this decryption may be a decrypted NACHA Entry 610. The decrypted NACHA Entry 610 includes the original values of the sensitive values. For example, the individual name is "JOHN REGINALD SMITH II" in the decrypted Entry 610 rather than the tokenized value of "tUiNmmE29kLpdBqPMfZ27m" as shown in the tokenized NACHA Entry 510.

Figure 7:
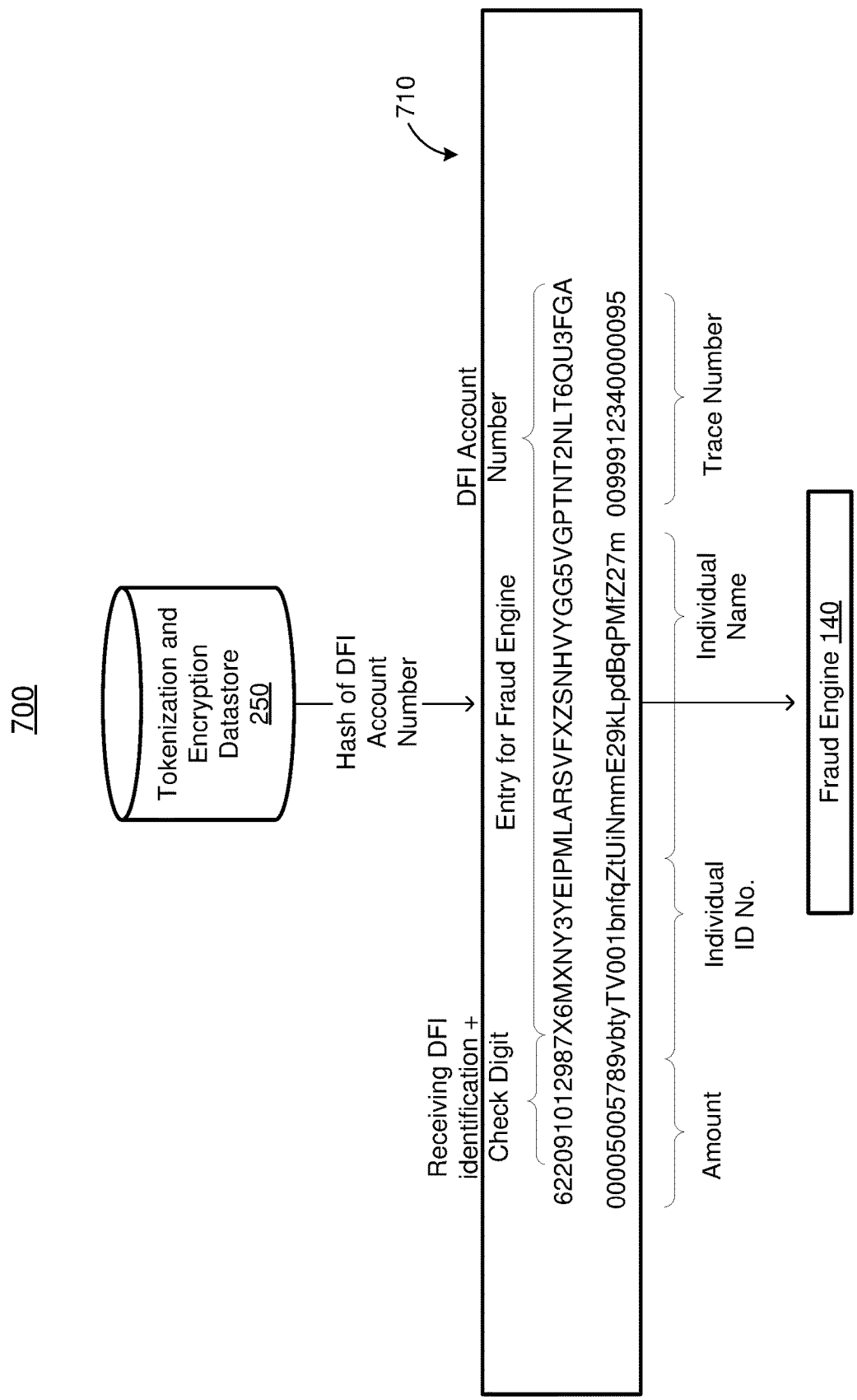
FIG. 7 is a diagram of a value-level data flow for providing a secured NACHA entry for a fraud engine, in accordance with at least one embodiment.

FIG. 7 is a diagram of a value-level data flow 700 for providing a secured NACHA entry for a fraud engine, in accordance with at least one embodiment. The secure transfer system 110 may retrieve a hashed value of the DFI account number from the tokenization and encryption datastore 250. The secure transfer system 110 may parse each transaction request within a transaction request file to extract tokenized values used to produce corresponding primary keys for querying the datastore 250 for the hashed values of the DFI account number for each transaction request. The secure transfer system 110 may then substitute the hashed value (e.g., a SHA-224 hash) for the tokenized DFI account number within a secured transaction request entry within a transaction request file. The resultant Entry 710 may be used for the fraud engine 140, where the Entry 710 includes a tokenized individual identification number, tokenized individual name, and hashed DFI account number so that the fraud engine 140 may recognize fraudulent activities against normal activities associated with the DFI account number.

Figure 8:
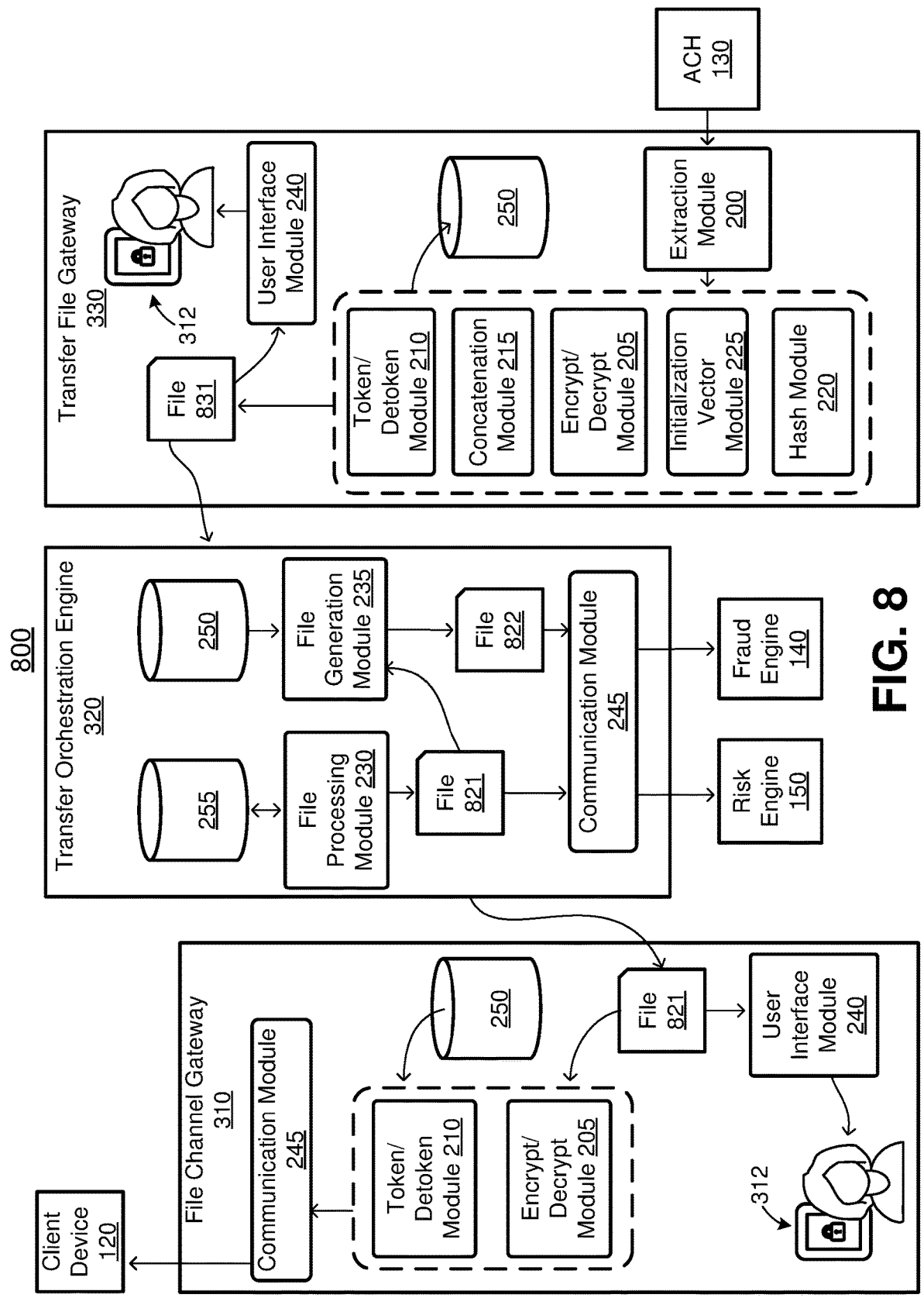
FIG. 8 depicts a block diagram of a data transfer flow from an automated clearing house to a client device of FIG. 1, in accordance with at least one embodiment.

FIG. 8 depicts a block diagram of a data transfer flow 800 from the automated clearing house 130 to the client device 120 of FIG. 1, in accordance with at least one embodiment. The data transfer flow 800 may be performed by the secure transfer system 110. The data transfer flow 800 may be performed by different subsystems of the secure transfer system 110: the file channel gateway 310, the transfer orchestration engine 320, and the transfer file gateway 330. Similar to the data flow 300 of FIG. 3, the subsystems may represent a partitioning of software or hardware modules. In some embodiments, the subsystems may represent a logical partitioning of operations performed by the secure transfer system 110.

The data transfer flow 800 may be an example process by which the automated clearing house 130 transmits returned payments or notification of changes. The returned payments may be payments that the receiving DFI could not process. For example, if the beneficiary of a transaction request (e.g., a payroll payment) closed their account at their bank, the DFI account number may no longer be valid. In this example, the receiving DFI may return this payment to the originating DFI, which may be the bank of the client to which the client device 120 belongs and from which the funds would have been debited from. The NOC may be created by the receiving DFI to notify the originating DFI that previously valid information contained in a payroll payment is no longer valid. For example, if the beneficiary's bank has merged with another bank, a new receiving DFI identification number should be used for subsequent payments to that particular beneficiary. In another example, the beneficiary has changed their name (i.e., the individual name) and the originating DFI should update its records with the corrected information.

Returned payments and NOCs may contain sensitive information, which may be similar or the same as the sensitive information included within payment file requests from the client device 120 to the automated clearing house 130 as described in the description of FIGS. 3-7. The sensitive information within returned payments and NOCs may be tokenized and encrypted to secure the beneficiary's details throughout processing by the secure transfer system 110 (e.g., such that an administrator of the secure transfer system 110 cannot access confidential information).

In some embodiments, the automated clearing house 130 may be the United States Federal Reserve Bank's FedACH network, which may send returned payments or NOCs to the client device 120 for the device to correct the issues associated with the returned payments or NOCs. The returned payments or NOCs referenced with respect to the data flow 800 may be distinct from the payment file requests as described with respect to the data flow 300.

The data flow 800 may begin with the automated clearing house 130 transmitting a file including one or more returned payment or one or more NOCs. The file may be a NACHA-formatted file. The transfer file gateway 330 may parse and extract certain values of the received file to secure. For example, the extraction module 200 may parse the file to verify whether the file is in the proper format (e.g., the NACHA format). Each returned payment or NOC may include similar values as described with respect to the transaction request file (i.e., due to the shared NACHA formatting). The extraction module 200 may extract values of the individual name, individual identification number, and the DFI account number from the file. The token/detoken module 210 may tokenize the extracted values and the concatenation module 215 may concatenate and store the tokenized data into the tokenization and encryption datastore 250. The concatenated value may serve as a primary key for the specific payment return or NOC in the file received from the automated clearing house 130 for subsequent queries to the datastore 250.

The transfer file gateway 330 may concatenate and apply a hashing algorithm to the DFI account number, the receiving DFI identification, and the check digit for the receiving DFI identification. For example, the concatenation module 215 may concatenate these values and the hash module 220 may apply a SHA-224 hashing algorithm to the concatenation, which may then be stored within the datastore 250. The transfer file gateway 330 may concatenate and apply encryption to the DFI account number, the individual identification number, and the individual name. For example, the concatenation module 215 may concatenate these values and the encrypt/decrypt module 205 may apply a symmetric-key cryptographic block cipher to the concatenation. The encrypt/decrypt module 205 may further employ an initialization vector or AAD as part of the encryption. The initialization vector module 225 may generate the random IV. The transfer file gateway 330 may use values of the amount, DFI account number, the receiving DFI identification, and check digit as AAD for the encryption. The encrypted value, the initialization vector, or the AAD may be stored within the datastore 250. A secret key used for the encryption may be stored in the transfer orchestration engine datastore 255.

The transfer file gateway 330 may produce a file 831 including the secured values corresponding to the values originally received in the returned payment or NOC from the automated clearing house 130. The transfer file gateway 330 may provide the secured values within the file 831 for display to an administrator device 312 using the user interface module 240. The display of the file 831 at the administrator device 312 does not compromise the confidential information within the returned payment or NOC due to the methods of hashing, encryption, or tokenization as performed by the transfer file gateway 330. The transfer file gateway 330 may provide the file 831 to the transfer orchestration engine 320 for further processing.

The transfer orchestration engine 320 may process files received from the transfer file gateway 330 or generate one or more new files (e.g., to provide to the risk engine 150 or the fraud engine 140). For each transaction request within a file (e.g., a returned payment or NOC), the file processing module 230 may perform validations on each entry such as formatting and syntax checks. If the transaction request is a returned payment, the transfer orchestration engine 320 may also transmit a request to the client's credit check service to credit the funds back to the client's account. For an NOC, the file processing module 230 may not apply credit to the client's account. The file processing module 230 may log returned payments within an electronic ledger. For example, the file processing module 230 may determine the sum of returned payments contained in the file from the automated clearing house 130 and enter the sum as a credit entry on the client's account in the electronic ledger. For an NOC, the file processing module 230 may not enter any fund movement into the electronic ledger. Generally, NOCs do not result in funds debited or credited to the client's account. Instead, NOCs serve as information messages from the receiving DFI to correct future transaction request details of the beneficiary.

The file processing module 230 may store values (e.g., tokenized values) from the returned payment or NOC files within the transfer orchestration engine datastore 255 for audit, tracking, reporting, or reconciliation. A file 821 may be the file 831 as processed by the processing module 230. The transfer orchestration engine 320 may transmit the file 821 to the risk engine 150 via the communication module 245. The file 821 may include tokenized values of the individual name, individual identification number, and the DFI account number for similar reasons as described with respect to the data flow 300, the risk engine 150 may gather statistics regarding the NOCs or returned payments without a consistent identifying value (e.g., a hashed DFI account number).

The file generation module 235 may generate one or more new files (e.g., NACHA formatted files). A new file 822 may be generated from the contents of the file 821 as processed by the file processing module 230. The file generation module 235 may further process the newly generated file 822 to prepare the file for transmitting to a destination (e.g., the fraud engine 140). The file generation module 235 may extract tokenized values of the individual name, the individual identification number, and the DFI account number and concatenate the tokenized values. The file generation module 235 may use the concatenation as the primary key for querying the tokenization and encryption datastore 250 for the hashed values of the original DFI account number for each transaction request within the new file 822. The file generation module 235 may substitute the tokenized DFI account number for the hashed DFI account number and transmit the file 822 with the hashed DFI account number to the fraud engine 140 (e.g., via the communication module 245).

The file channel gateway 310 may receive the file 821 from the transfer orchestration engine 320 for detokenization. The token/detoken module 210 may detokenize the values of the individual name, individual identification number, and the DFI account number within the file 821. The token/detoken module 210 may obtain, for each transaction request within the file 821, the primary key for querying the tokenization and encryption datastore 250 for an entry containing the encrypted value produced by the encrypt/decrypt module 205 of the transfer file gateway 330, AAD values used for the encryption, and the initialization vector generated by the initialization vector module 225 of the transfer file gateway 330. The encrypt/decrypt module 205 may use the retrieved entry and a secret key for symmetric-key cryptographic block cipher decryption to obtain the original values for the tokenized values of the individual name, individual identification number, and the DFI account number.

The file channel gateway 310 may replace the tokenized values with the decrypted, original values. The resultant file may be encrypted and sent to the client device 120 (e.g., via the communication module 245) where the client may carry out further processing. Tokenized values may be absent from the resultant file so that the client device 120 may examine and discern the beneficiaries for each returned payment or NOC in the file.

Data Transfer User Interface

FIG. 9 depicts a graphical user interface (GUI) 900 for providing secured values of transaction request fields for display, in accordance with at least one embodiment. The secure transfer system 110 may generate the GUI for display at a device (e.g., the administrator device 312). The GUI 900 may display the transaction request entries within a transaction request file transmitted by the client device 120. Administrators of the secure transfer system 110 may be authorized to access the transaction request files (e.g., for auditing or tracking), but may be prevented from viewing the original values of all sensitive values within the transaction request files. The original values may not be necessary for the administrator to view and thus, may be tokenized to further protect the beneficiaries' sensitive information. The GUI 900 may display tokenized values of DFI account numbers, individual identification numbers, and individual names to protect sensitive information of beneficiaries. The GUI 900 may further display trace numbers that serve as unique identifiers for each request in a transaction request file. For example, the trace number may be used for different groups of people (e.g., those that have access to the sensitive data and those that do not) to communicate issues or questions they may have about any specific transaction.

Some original values of the transaction request files may be presented as needed for the administrator to analyze the application of the secure transfer system 110. For example, the GUI 900 may display the original values of the amounts of each transaction request to track the amount of funds transferred within the transaction request. The amounts may be shown concurrently with tokenized values so that the amounts cannot be associated with a particular beneficiary. Thus, the GUI 900 enables an administrator to analyze information within transaction request files while providing anonymity for beneficiaries.

Processes for Processing a Transaction Request Using the Secure Transfer System

Figure 10:
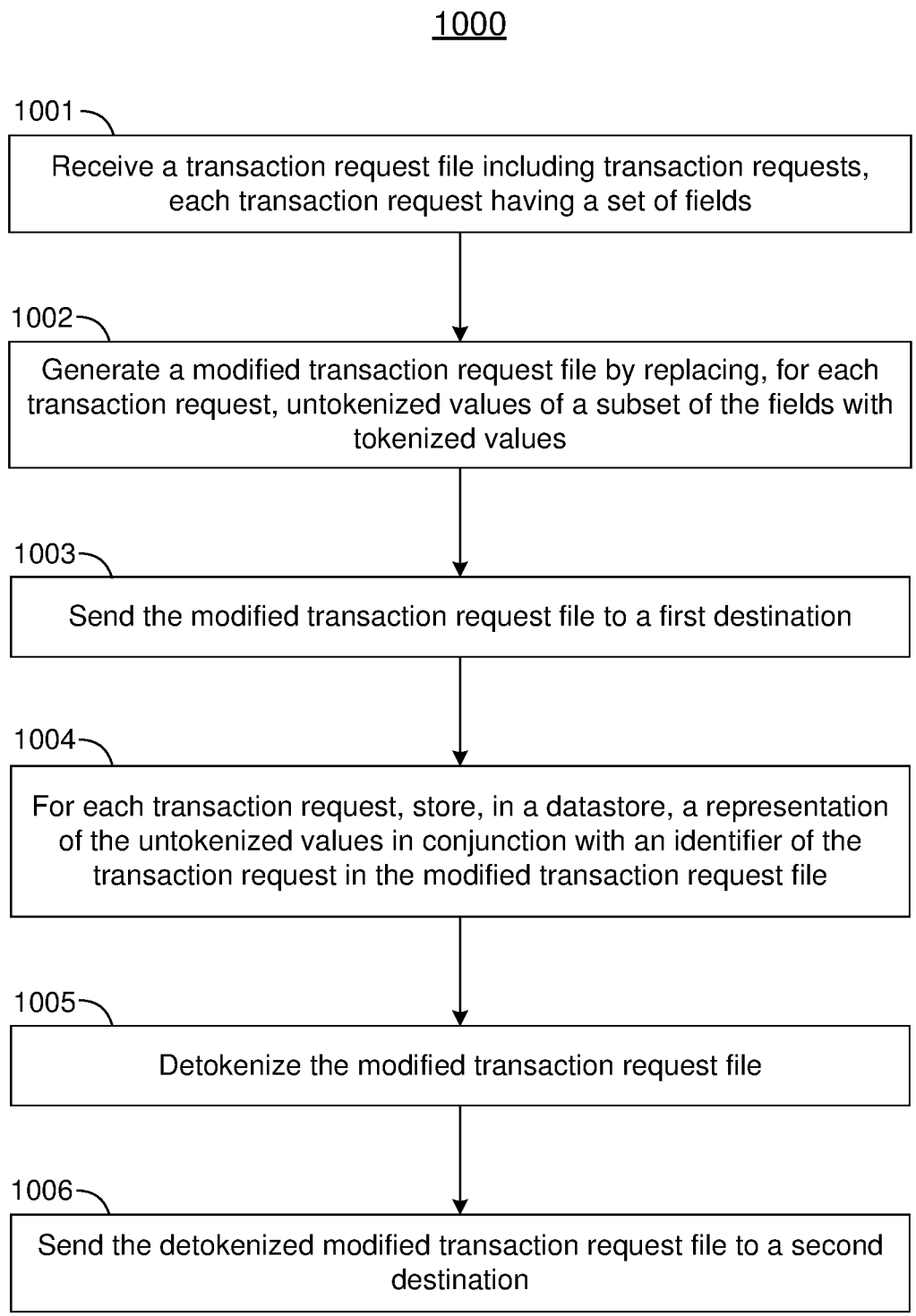
FIG. 10 is a flowchart illustrating a process for securing a transaction request file for sending to one or more destinations, in accordance with at least one embodiment.

FIG. 10 is a flowchart illustrating a process 1000 for securing a transaction request file for sending to one or more destinations, in accordance with at least one embodiment. The secure transfer system 110 may perform the operations of the process 1000 in parallel or in different orders, or may perform different steps. For example, the secure transfer system 110 may send 1003 the modified transaction request file to a first destination in parallel to storing 1004 a representation of the untokenized values for each transaction request.

The secure transfer system 110 receives 1001 a transaction request file. For example, a client device may send the secure transfer system a file containing payroll data. The transaction request file may include transaction requests, where each transaction request has a set of fields. In the example where the secure transfer system 110 receives 1001 a file containing payroll data, the file may include requests to pay a list of beneficiaries, where each request includes fields such as a beneficiary's name, a bank account number from which a payment will be debited from, the beneficiary's bank account number, etc.

The secure transfer system 110 generates 1002 a modified transaction request file by replacing, for each transaction request, untokenized values of a subset of the fields with tokenized values. For example, the secure transfer system 110 tokenizes a DFI account number, an individual ID number, and an individual name of each transaction request in a payroll file. The secure transfer system 110 may replace the untokenized values of the aforementioned fields with the tokenized values. The generated 1002 file with the tokenized values is the modified transaction request file. The modified transaction request file may be provided for display, by the secure transfer system 110, at a computing device of an administrator (e.g., an authorized administrator of the secure transfer system). The secure transfer system 110 may send 1003 the modified transaction request file to another destination such as a risk engine.

The tokenized values may be used to generate an identifier for subsequent detokenization by the secure transfer system 110. For example, the tokenized DFI account number, individual ID number, and individual name of a given transaction request may be combined (e.g., concatenated) to create the identifier to retrieve encrypted values of a given transaction request and encryption objects stored in a datastore (e.g., the tokenization and encryption datastore 250) related to the given transaction request. The values used to generate the identifier may be user-specified (e.g., specified by an administrator of the secure transfer system 110).

The secure transfer system 110 may store 1004, for each transaction request, a representation of the untokenized values in a datastore. The secure transfer system 110 may also store 1004 an identifier of the transaction request in the modified transaction request file in conjunction with the representation. For example, the secure transfer system 110 may store a representation of a transaction request in a payroll file, where the representation includes an encrypted DFI account number, an encrypted individual ID number, and an encrypted individual name. In some embodiments, a concatenation of the original, untokenized values of the DFI account number, individual ID number, and individual name are encrypted and included in the representation. In some embodiments, a concatenation of the original, untokenized values of the DFI account number, receiving DFI identification, and check digit are hashed and included in the representation. The representation is stored within a datastore such as the tokenization and encryption datastore 250. In this way, the secure transfer system 110 increases the security of a beneficiary's private information by storing secured values of sensitive information.

The secure transfer system 110 may detokenize 1005 the modified transaction request file. For example, the secure transfer system 110 may prepare the transaction requests in the file for verification by a fraud engine or for payment fulfillment via an automated clearing house. The secure transfer system 110 may detokenize 1005 the file such that it may be processed by the file's destination. One example of a process for detokenizing 1005 the file is described in the description of FIG. 11. To detokenize the modified transaction request file, the secure transfer system 110 accesses the datastore (e.g., the tokenization and encryption datastore 250) and may replace tokenized values of transaction requests within the modified transaction request file according to a destination for the detokenized values. For example, the secure transfer system 110 may identify a destination is an automated clearing house and detokenize the values of a transaction request file for the automated clearing house such that the file sent 1006 to the automated clearing house contains the same values received by the client device (i.e., original, untokenized values).

After detokenizing the modified transaction request file, the secure transfer system 110 sends 1006 the detokenized modified transaction request file to a destination different from the destination to which the modified transaction request file was sent 1003. Examples of destinations to which the detokenized modified transaction request file may be sent include a fraud engine or an automated clearing house. In one example, while an automated clearing house may require all values within a payroll file to be untokenized, a fraud engine may require an amount value to be untokenized while an individual name may be tokenized and a DFI account number may be hashed. The secure transfer system 110 may detokenize the modified transaction request file according to a destination. Thus, the secure transfer system 110 may maintain the security of sensitive values in a transaction request file while allowing the destination access to untokenized values as needed.

Figure 11:
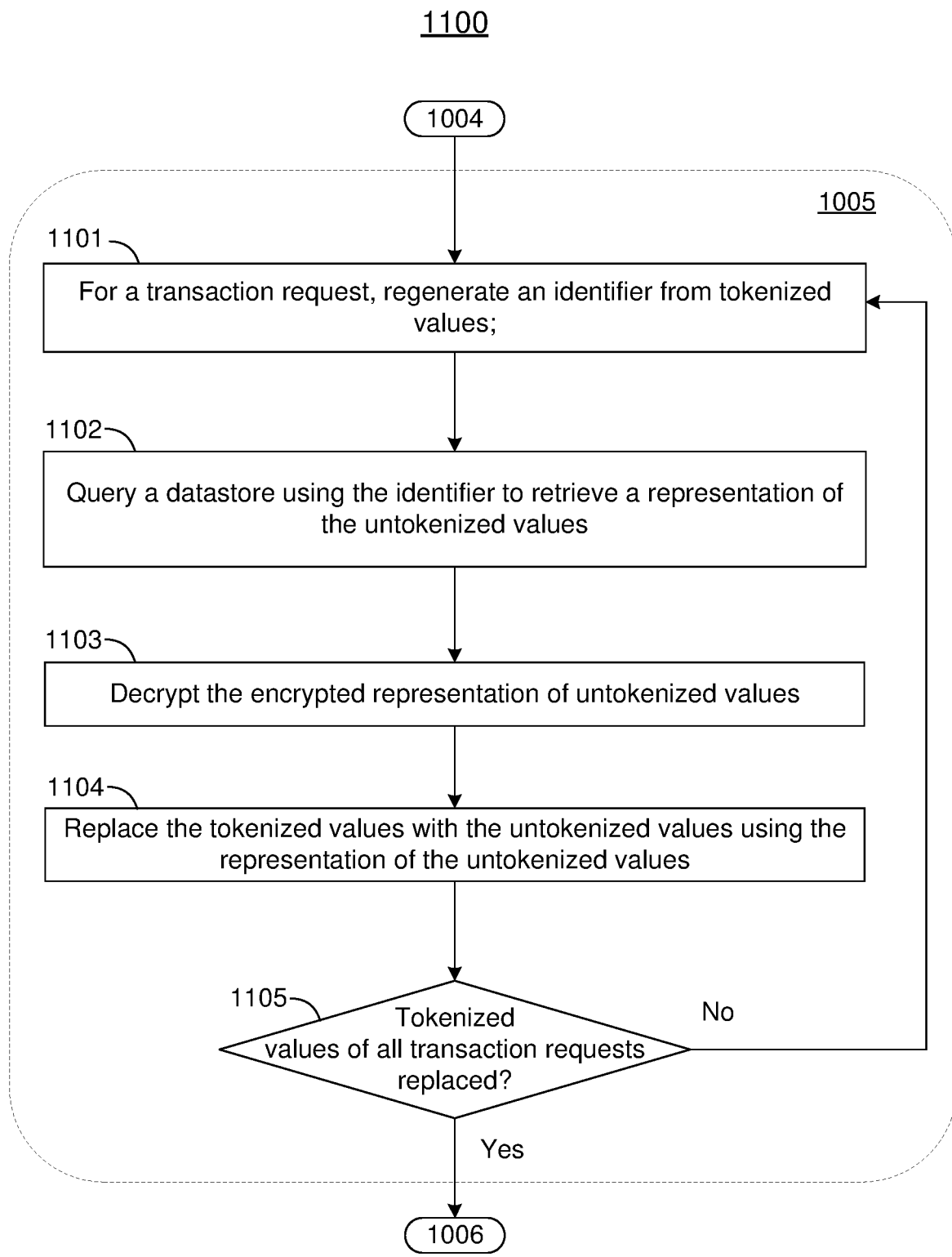
FIG. 11 is a flowchart illustrating a process for detokenizing a modified transaction request file, in accordance with at least one embodiment.

FIG. 11 is a flowchart illustrating a process 1100 for detokenizing a modified transaction request file, in accordance with at least one embodiment. The secure transfer system 110 may perform the operations of the process 1100. The process 1100 is depicted as a subprocess of the process 1000. The secure transfer system 110 may detokenize 1005 the modified transaction request file by, for each transaction request, regenerating 1101 an identifier from tokenized values, querying 1102 a datastore using the identifier to retrieve a representation of the untokenized values, and replacing 1103 the tokenized values with the untokenized values.

The secure transfer system 110 regenerates 1101 an identifier from tokenized values for a transaction request of a transaction request file. For example, the secure transfer system 110 regenerates the identifier that was initially generated when tokenizing the untokenized values of a transaction request in a received payroll file. The tokenized values of the DFI account number, individual identification number, and individual name of a transaction request of a payroll file may be concatenated to regenerate 1101 the identifier. The file may be in a predetermined format such as a NACHA format such that the secure transfer system 110 may identify the tokenized values needed to regenerate the identifier within a transaction request according to the format for concatenation.

The secure transfer system 110 queries 1102 a datastore using the identifier to retrieve a representation of the untokenized values. For example, the secure transfer system 110 queries the tokenization and encryption datastore 250 using the identifier to retrieve values of the DFI account number, individual identification number, and individual name that were encrypted using symmetric-key cryptographic block cipher encryption. The secure transfer system 110 may also retrieve from the datastore 250, using the identifier, decryption objects to decrypt the representation of the untokenized values. For example, the decryption objects may include AAD and an initialization vector that were used during encryption and thus, required for decryption.

The secure transfer system 110 decrypts 1103 the encrypted representation of untokenized values using symmetric-key block cipher decryption, an initialization vector, and AAD. The secure transfer system 110 replaces 1104 the tokenized values of a modified transaction request file with untokenized values using the representation of the untokenized values. The secure transfer system 110 may, for each transaction request in a modified transaction request file, replace 1104 tokenized values (e.g., of a DFI account number, individual identification number, and individual name) with the corresponding decrypted values. The secure transfer system 110 may iterate through each transaction request in a transaction request file to verify 1105 that the tokenized values of all transaction requests were replaced before sending 1006 the detokenized modified transaction request file to a destination. If all transaction requests have not been detokenized, the secure transfer system 110 may continue iterating, regenerating 1101 an identifier for a subsequent transaction request to detokenize the subsequent transaction request's tokenized values.

Additional Considerations

Some portions of the preceding detailed descriptions have been presented in terms of algorithms and symbolic representations of operations on data bits within a computer memory. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. The software modules described herein may be embodied as program code (e.g., software comprised of instructions stored on non-transitory computer readable storage medium and executable by at least one processor) or hardware (e.g., application specific integrated circuit (ASIC) chips or field programmable gate arrays (FPGA) with firmware). The modules correspond to at least having the functionality described herein when executed/operated.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for securing data, the method comprising:
   receiving a transaction request file including transaction requests, each transaction request having a set of fields;
   generating a first modified transaction request file by replacing, for each transaction request, untokenized values of a subset of the fields with tokenized values;
   for each transaction request, storing, in a datastore, a representation of the untokenized values in conjunction with an identifier of the transaction request in the first modified transaction request file, the identifier of the transaction request generated from the tokenized values;
   determining a total number of transaction requests in the first modified transaction request file;
   comparing the total number of transaction requests to a minimum request threshold;
   generating, responsive to determining that the total number of transaction requests is less than the minimum request threshold, a new modified transaction request file by:
      combining the one or more transaction requests of the first modified transaction request file and one or more transaction requests of a second modified transaction request file such that the combined transaction requests is equivalent to or greater than the minimum request threshold;
   sending the new modified transaction request file to a first destination;
   detokenizing the first modified transaction request file by, for each transaction request:
      regenerating the identifier of the transaction request from the tokenized values;
      querying the datastore using the identifier of the transaction request to retrieve the representation of the untokenized values; and
      replacing the tokenized values with the untokenized values using the representation of the untokenized values; and
   sending the detokenized modified transaction request file to a second destination.

2. The method of claim 1, further comprising generating the identifier of the transaction request by combining two or more tokenized values of the tokenized values.

3. The method of claim 2, wherein the two or more tokenized values of the tokenized values comprise two or more of an individual name, an individual identification number, and a depository financial institution (DFI) account number.

4. The method of claim 2, wherein combining the two or more tokenized values comprises concatenating the two or more tokenized values.

5. The method of claim 1, further comprising generating the representation of the untokenized values by:
   applying a hash algorithm to a first untokenized value of the untokenized values; and
   encrypting a second untokenized value of the untokenized values.

6. The method of claim 5, wherein the first untokenized value is a DFI account number of the set of the fields and the second untokenized value is one of the DFI account number, an individual identification number, or an individual name of the set of the fields.

7. The method of claim 5, wherein the second untokenized value is encrypted based on a symmetric-key cryptographic block cipher and one or more of an initialization vector or additional authenticated data (AAD), and wherein the datastore is a first datastore and a secret key associated with the symmetric-key cryptographic block cipher is stored in a second datastore.

8. The method of claim 7, further comprising generating the initialization vector comprising one or more randomized values.

9. The method of claim 7, wherein the AAD comprises one or more of a trace number, a DFI account number, a receiving DFI identification, or a check digit of the set of the fields.

10. The method of claim 7, wherein replacing the tokenized values with the untokenized values using the representation of the untokenized values comprises:
    inputting (i) the tokenized values, and (ii) the one or more of the initialization vector or AAD into the symmetric-key cryptographic block cipher for decryption.

11. The method of claim 1, wherein the first destination is a risk engine and the second destination is an automated clearing house.

12. The method of claim 1, wherein the subset of the fields comprises a DFI account number, an individual identification number, and an individual name.

13. The method of claim 1, further comprising:
    detokenizing a tokenized value of the representation of the untokenized values in each transaction request of the first modified transaction request file by, for each transaction request:

regenerating the identifier of the transaction request from the tokenized values;
querying the datastore using the identifier of the transaction request to retrieve a hashed representation of a field in set of the fields; and
replacing the tokenized value of the representation with the hashed representation of the field; and
sending a second detokenized modified transaction request file to a fraud engine, wherein the detokenized modified transaction request file is a first detokenized modified transaction request file.

14. The method of claim 1, further comprising providing for display at a computing device a graphical user interface comprising the tokenized values of the new modified transaction request file.

15. The method of claim 1, further comprising:
comparing the total number of transaction requests to a maximum request threshold; and
generating, responsive to determining that the total number of transaction requests is greater than the maximum request threshold, a plurality of new modified transaction request files by:
dividing the one or more transaction requests of the first modified transaction request file among the plurality of new modified transaction request files such that each of the total number of transaction requests in the plurality of new modified transaction request files is less than the maximum request threshold.

16. The method of claim 1, wherein the new modified transaction request file is in a National Automated Clearing House Association (NACHA) format.

17. A non-transitory computer readable medium comprising stored instructions for securing data, the instructions when executed by at least one processor cause the at least one processor to:
receive a transaction request file including transaction requests, each transaction request having a set of fields;
generate a first modified transaction request file by replacing, for each transaction request, untokenized values of a subset of the fields with tokenized values;
for each transaction request, store, in a datastore, a representation of the untokenized values in conjunction with an identifier of the transaction request in the modified transaction request file, the identifier generated from the tokenized values;
determine a total number of transaction requests in the first modified transaction request file;
compare the total number of transaction requests to a minimum request threshold; and
generate, responsive to determining that the total number of transaction requests is less than the minimum request threshold, a new modified transaction request file by:
combining the one or more transaction requests of the first modified transaction request file and one or more transaction requests of a second modified transaction request file such that the combined transaction requests is equivalent to or greater than the minimum request threshold;
send the new modified transaction request file to a first destination;
detokenize the first modified transaction request file by, for each transaction request:
regenerating the identifier of the transaction request from the tokenized values;
querying the datastore using the identifier of the transaction request to retrieve the representation of the untokenized values; and
replacing the tokenized values with the untokenized values using the representation of the untokenized values; and
send the detokenized modified transaction request file to a second destination.

18. The non-transitory computer readable medium of claim 17, further comprising instructions when executed by at least one processor cause the at least one processor to:
detokenize a tokenized value of the representation of the untokenized values in each transaction request of the first modified transaction request file by, for each transaction request:
regenerating the identifier of the transaction request from the tokenized values;
querying the datastore using the identifier of the transaction request to retrieve a hashed representation of a field in set of the fields; and
replacing the tokenized value of the representation with the hashed representation of the field; and
send a second detokenized modified transaction request file to a fraud engine, wherein the detokenized modified transaction request file is a first detokenized modified transaction request file.

19. The non-transitory computer readable medium of claim 17, further comprising instructions when executed by at least one processor cause the at least one processor to provide for display at a computing device a graphical user interface comprising the tokenized values of the new modified transaction request file.

20. A method for securing data, the method comprising:
receiving a transaction request file including transaction requests, each transaction request having a set of fields;
generating a first modified transaction request file by replacing, for each transaction request, untokenized values of a subset of the fields with tokenized values;
for each transaction request, storing, in a datastore, a representation of the untokenized values in conjunction with an identifier of the transaction request in the first modified transaction request file, the identifier of the transaction request generated from the tokenized values;
determining a total number of transaction requests in the first modified transaction request file;
comparing the total number of transaction requests to a maximum request threshold;
generating, responsive to determining that the total number of transaction requests is greater than the maximum request threshold, a plurality of new modified transaction request files by:
dividing the one or more transaction requests of the first modified transaction request file among the plurality of new modified transaction request files such that each of the total number of transaction requests in the plurality of new modified transaction request files is less than the maximum request threshold;
sending the new modified transaction request file to a first destination;
detokenizing the first modified transaction request file by, for each transaction request:
regenerating the identifier of the transaction request from the tokenized values;
querying the datastore using the identifier of the transaction request to retrieve the representation of the untokenized values; and replacing the tokenized values with the untokenized values using the representation of the untokenized values; and sending the detokenized modified transaction request file to a second destination.

* * * * *